United States Patent
Fujita et al.

(10) Patent No.: US 9,628,712 B2
(45) Date of Patent: Apr. 18, 2017

(54) IMAGE PROCESSING DEVICE, IMAGE PROCESSING METHOD, AND STORAGE MEDIUM

(71) Applicant: CASIO COMPUTER CO., LTD., Shibuya-ku, Tokyo (JP)

(72) Inventors: Ken Fujita, Mitaka (JP); Maho Suzuki, Hamura (JP)

(73) Assignee: CASIO COMPUTER CO., LTD., Tokyo (JP)

(*) Notice: Subject to any disclaimer, the term of this patent is extended or adjusted under 35 U.S.C. 154(b) by 227 days.

(21) Appl. No.: 14/222,515

(22) Filed: Mar. 21, 2014

(65) Prior Publication Data
US 2014/0285677 A1    Sep. 25, 2014

(30) Foreign Application Priority Data

Mar. 22, 2013  (JP) ................. 2013-060079
Apr. 11, 2013  (JP) ................. 2013-082562

(51) Int. Cl.
*H04N 5/232*    (2006.01)

(52) U.S. Cl.
CPC ..... *H04N 5/23267* (2013.01); *H04N 5/23258* (2013.01)

(58) Field of Classification Search
CPC .......... H04N 5/23248; H04N 5/23254; H04N 5/23267; H04N 5/23258; H04N 5/23264
USPC ..................................... 348/208.6
See application file for complete search history.

(56) References Cited

U.S. PATENT DOCUMENTS

| | | | | |
|---|---|---|---|---|
| 2010/0231731 | A1* | 9/2010 | Motomura | H04N 5/23248 348/208.4 |
| 2011/0298937 | A1* | 12/2011 | Ogawa | H04N 5/23258 348/208.4 |
| 2011/0306869 | A1* | 12/2011 | Hwang | A61B 8/14 600/411 |
| 2012/0069204 | A1* | 3/2012 | Shimizu | H04N 5/23277 348/208.4 |

FOREIGN PATENT DOCUMENTS

| | | |
|---|---|---|
| JP | 2007-300581 A | 11/2007 |
| JP | 2011-250235 A | 12/2011 |
| JP | 2012044418 A | 3/2012 |
| JP | 2012178705 A | 9/2012 |

OTHER PUBLICATIONS

Japanese Office Action dated Jan. 15, 2015, issued in counterpart Japanese Application No. 2013-060079.

* cited by examiner

*Primary Examiner* — Twyler Haskins
*Assistant Examiner* — Fayez Bhuiyan
(74) *Attorney, Agent, or Firm* — Holtz, Holtz & Volek PC

(57) ABSTRACT

When interval capturing by an imaging section is performed, a CPU acquires a blur state at a capture timing from the detection result by an acceleration sensor, and performs pre-processing (camera-shake processing: trimming processing in consideration of a blur) on the captured image corresponding to the blur state. Also, when the blur is larger than a predetermined value, the CPU further performs post-processing (camera-shake processing: trimming processing in consideration of a blur) also on images captured at capture timings preceding to and subsequent to the capture timing for capturing the image based on the blur state (more specifically, processing lighter in load than the pre-processing at the capture timing).

23 Claims, 14 Drawing Sheets

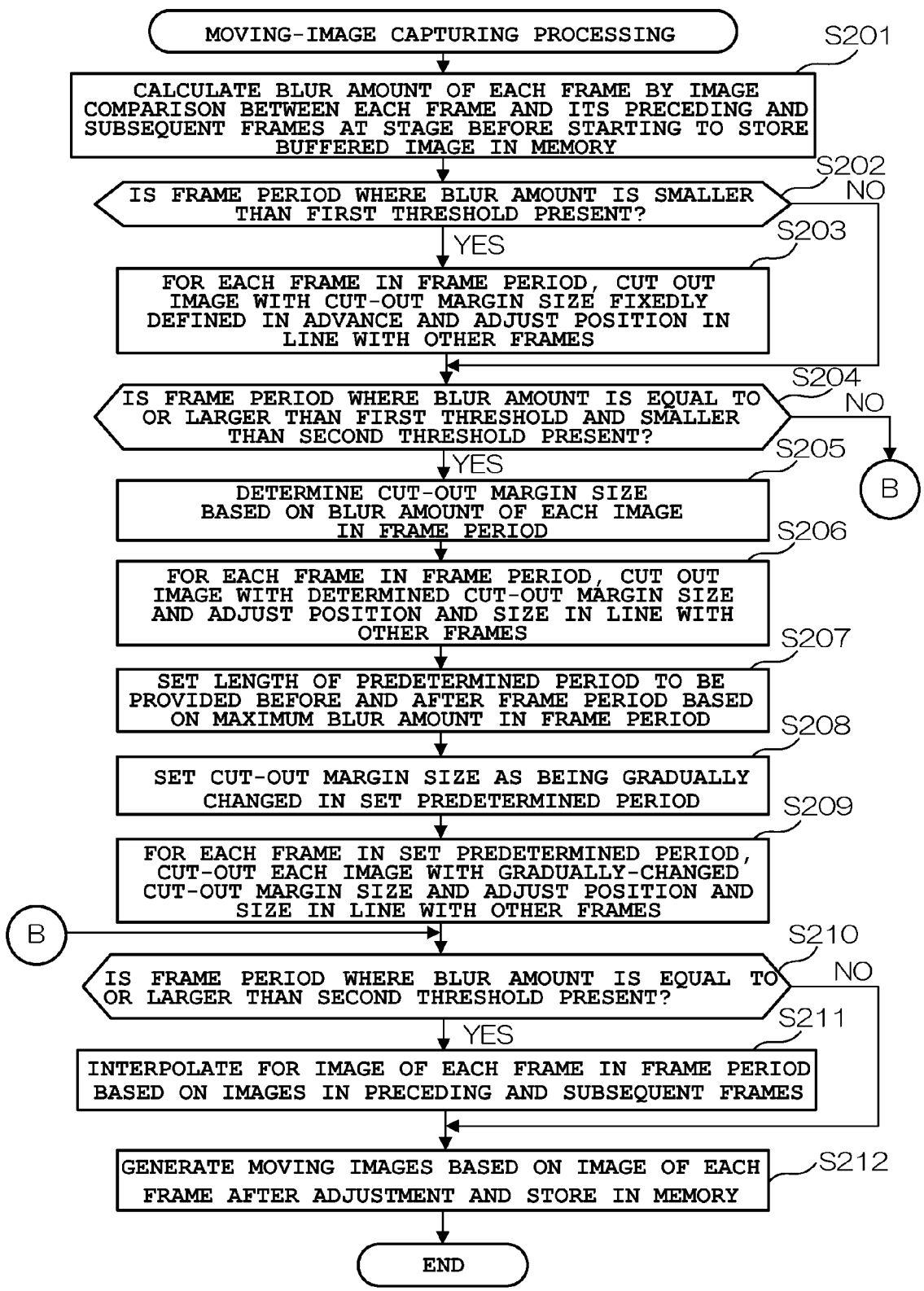

IMAGE PROCESSING DEVICE, IMAGE PROCESSING METHOD, AND STORAGE MEDIUM

CROSS-REFERENCE TO RELATED APPLICATIONS

This application is based upon and claims the benefit of priority from the prior Japanese Patent Application No. 2013-060079, filed Mar. 22, 2013, and No. 2013-082562, filed Apr. 11, 2013, the entire contents of which are incorporated herein by reference.

BACKGROUND OF THE INVENTION

1. Field of the Invention

The present invention relates to an image processing device, image processing method, and a storage medium.

2. Description of the Related Art

Some of capturing devices such as digital cameras, video cameras, and portable cameras with a moving-image capture function have an electronic camera-shake correction function of cutting out part of an image acquired from an image sensor at the time of moving-image capturing and adjusting the position of the cut-out image according to the direction and amount of a detected camera shake to correct the camera shake.

In this electronic camera-shake correction function, a blank region (margin) of a size according to the camera-shake amount is required to be provided around an effective pixel region of the image sensor to allow correction. However, since a large recorded image region is desired, the correction-allowable region is limited.

For this reason, a large blur occurring due to a large shake of the device body itself cannot be corrected.

Moreover, when a photographer hastily and greatly moves the capturing device at the time of capturing, correction cannot be sufficiently made with the camera-shake correction function at the time of capturing, and video that makes viewers feel uncomfortable at the time of replaying the recorded images is disadvantageously acquired.

In this type of the conventional technology, as described in Japanese Patent Application Laid-Open (Kokai) Publication No. 2007-300581, even when a large image blur that cannot be corrected with a cut-out size set in advance occurs, the cut-out size is dynamically reduced to allow correction of this large blur.

In the above-described conventional technology, when a large change (blur) occurs in moving images captured and the cut-out size is reduced, it is necessary to perform enlargement processing in order to match the size of an image cut out in this state to the size of images in other frames. However, due to an abrupt change of the enlargement ratio in accordance with the change of the cut-out size, continuity of the moving images may be impaired.

SUMMARY OF THE INVENTION

An object of the present invention is that correction of even a large blur in moving images can be captured, and also continuous moving images can be acquired.

In accordance with one aspect of the present invention, there is provided an image processing device comprising: an acquiring section which acquires a blur at imaging in a captured moving image; a first setting section which sets, for a moving image in a predetermined period where a blur is acquired by the acquiring section among the captured moving images, a first correction range based on the blur of the moving image; and a second setting section which sets, for a moving image in at least either one of predetermined periods preceding and subsequent to the predetermined period where the blur is acquired by the acquiring section among the captured moving images, a second correction range based on the blur of the moving image in the predetermined period where the blur is acquired by the acquiring section.

Also, in accordance with another aspect of the present invention, there is provided an image processing device comprising: a storage section which stores a plurality of continuous images continuously captured at predetermined intervals as one set; an acquiring section which acquires a blur at continuous capturing; a first setting section which sets, for a set of continuous images in a continuous capturing period where a blur is acquired by the acquiring section among sets of the continuous images stored in the storage section, a first correction range based on the blur of the set of continuous images; and a second setting section which sets, for a set of continuous images in at least either one of periods preceding and subsequent to the continuous capturing period where the blur is acquired by the acquiring section among the sets of the continuous images stored by the storage section, a second correction range based on the blur of the set of continuous images in the continuous capturing period where the blur is acquired by the acquiring section.

Furthermore, in accordance with another aspect of the present invention, there is provided an image processing method comprising: an acquiring step of acquiring a blur at imaging of a captured moving image; a first setting step of setting, for a moving image in a predetermined period where the blur is acquired in the acquiring step among the captured moving images, a first correction range based on the blur of the moving image; and a second setting step of setting, for a moving image in the predetermined period where the blur is acquired in the acquiring step for a moving image in at least either one of predetermined periods preceding and subsequent to the predetermined period where the blur is acquired in the acquiring step among the captured moving images, a second correction range based on the blur of the moving image in the predetermined period where the blur is acquired in the acquiring step.

Still further, in accordance with another aspect of the present invention, there is provided an image processing method comprising: a storage step of storing a plurality of continuous images continuously captured at predetermined intervals as one set; an acquiring step of acquiring a blur at continuous capturing; a first setting step of setting, for a set of continuous images in a continuous capturing period where a blur is acquired in the acquiring step among sets of the continuous images stored in the storage step, a first correction range based on the blur of the set of continuous images; and a second setting step of setting, for a set of continuous images in at least either one of periods preceding and subsequent to the continuous capturing period where the blur is acquired in the acquiring step among the sets of the continuous images stored in the storage step, a second correction range based on the blur of the set of continuous images in the continuous capturing period where the blur is acquired in the acquiring step.

Furthermore, in accordance with another aspect of the present invention, there is provided a non-transitory computer-readable storage medium having stored thereon a program that is executable by a computer included in an image processing device, the program being executable by the computer to perform functions comprising: acquisition processing for acquiring a blur at imaging of a captured moving image; first setting processing for setting, for a moving image in a predetermined period where the blur is acquired by the acquisition processing among the captured moving images, a first correction range based on the blur of the moving image; and second setting processing for setting, for a moving image in the predetermined period where the blur is acquired by the acquisition processing for a moving image in at least either one of predetermined periods preceding and subsequent to the predetermined period where the blur is acquired in the acquisition processing among the captured moving images, a second correction range based on the blur of the moving image in the predetermined period where the blur is acquired by the acquisition processing.

Still further, in accordance with another aspect of the present invention, there is provided a non-transitory computer-readable storage medium having stored thereon a program that is executable by a computer included in an image processing device, the program being executable by the computer to perform functions comprising: storage processing for storing a plurality of continuous images continuously captured at predetermined intervals as one set; acquisition processing for acquiring a blur at continuous capturing; first setting processing for setting, for a set of continuous images in a continuous capturing period where a blur is acquired by the acquisition processing among sets of the continuous images stored by the storage processing, a first correction range based on the blur of the set of continuous images; and second setting processing for setting, for a set of continuous images in at least either one of periods preceding and subsequent to the continuous capturing period where the blur is acquired by the acquiring processing among the sets of the continuous images stored by the storage processing, a second correction range based on the blur of the set of continuous images in the continuous capturing period where the blur is acquired by the acquiring processing.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 14 is a flowchart of blur correction processing at the time of capturing moving images by the imaging device 100 in a third embodiment.

DETAILED DESCRIPTION OF THE PREFERRED EMBODIMENTS

Embodiments of the present invention will hereinafter be described with reference to the drawings.

First Embodiment

A. Configuration of Embodiment

Figure 1:
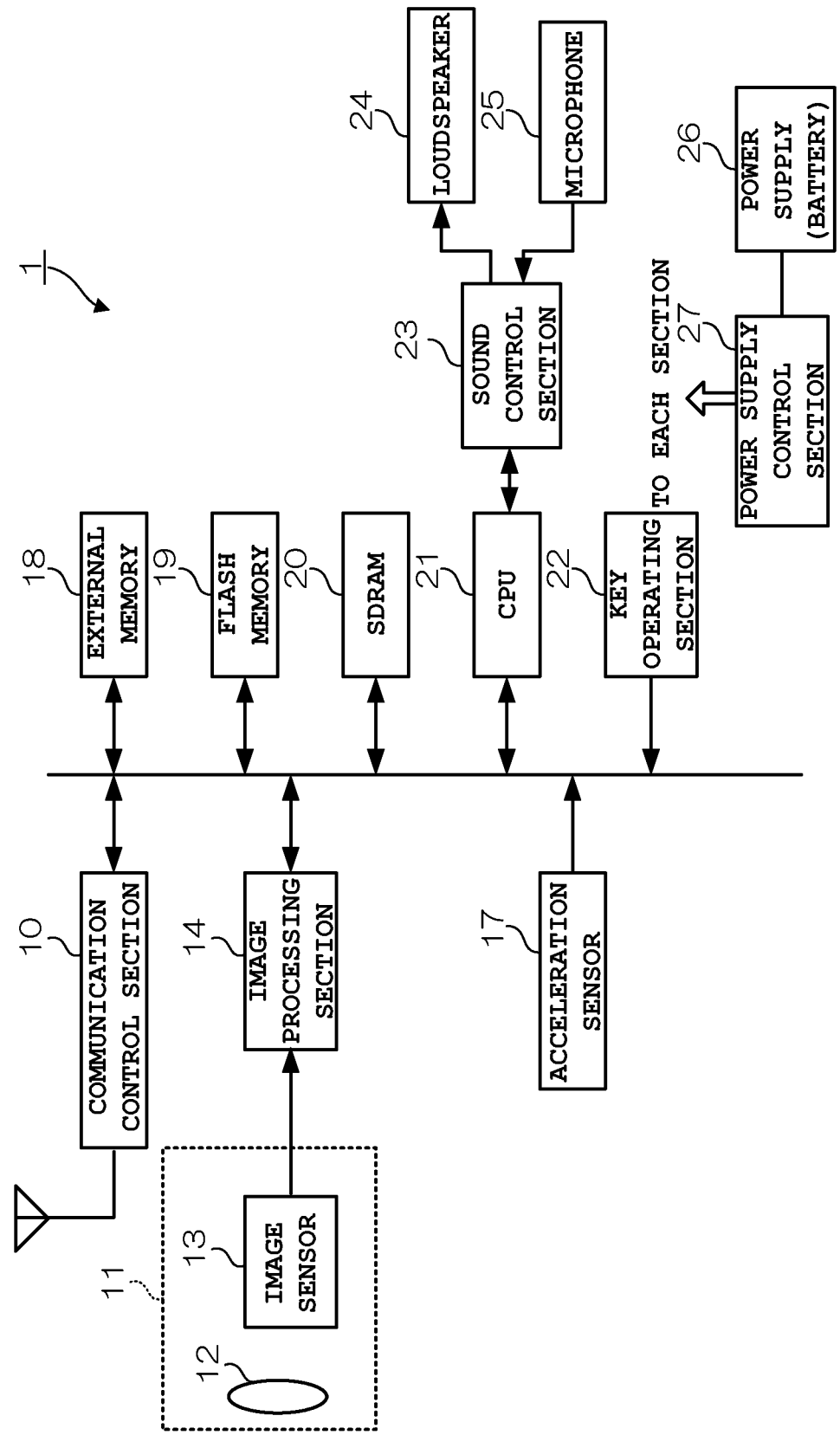
FIG. 1 is a block diagram showing the configuration of an imaging device 1 according to a first embodiment of the present invention.

FIG. 1 is a block diagram showing the configuration of an imaging device 1 according to an embodiment of the present invention. In FIG. 1, the imaging device 1 is a body-mount-type imaging device, and includes a communication control section 10, an imaging section 11, an image processing section 14, an acceleration sensor 17, an external memory 18, a flash memory 19, an SDRAM (Synchronous Dynamic Random Access Memory) 20, a CPU (Central Processing Unit) 21, a key operating section 22, a sound control section 23, a loudspeaker 24, a microphone 25, a power supply (battery) 26, and a power supply control section 27.

The communication control section 10 transfers captured image data to a server on the Internet, or an information processing device such as a private personal computer via the Internet. The image data can be transferred also to an information device carried by a photographer via peer-to-peer communications. The imaging section 11 includes a lens block 12 formed of an optical lens group and an image sensor 13 such as a CCD (Charge Coupled Device) or a CMOS (Complementary Metal Oxide Semiconductor). The image sensor 13 converts an image entering from the lens block 12 to a digital signal. The image processing section 14 performs image processing (such as pixel interpolation processing, γ correction, a luminosity color-difference signal generation, white balance processing, or exposure correction processing) and compression and expansion of image data (for example, compression and expansion of a JPEG (Joint Photographic Experts Group) format, Motion-JPEG format, or MPEG (Moving Picture Experts Group) format) on image data.

The acceleration sensor 17 detects the movement of the body-mount-type imaging device 1 (an elevation/depression angle direction: an up and down direction with a horizontal axis taken as a rotational axis). The external memory 18 is a removable storage medium, and stores image data captured by the imaging section 11 and the like. The flash memory 19 is a storage medium which stores the image data captured by the imaging section 11. The SDRAM 20 is used as a buffer memory which temporarily stores image data captured by the imaging section 11 and then sent to the CPU 21 and is also used as a working memory for the CPU 21.

The CPU 21 causes the imaging section 11 causes, for example, capturing a still image by the imaging section 11, starting/stopping recording of moving images, and switching between still-image capturing and moving-image capturing. In particular, in the present embodiment, when the imaging section 11 performs interval capturing, according to a correction range set in accordance with a previous blur state, the CPU 21 performs pre-processing in accordance with a blur state of captured images (interval movies) (camera-shake processing: trimming processing in consideration of a blur). Also, every time capturing is completed at a capture timing, when the blur state at the capture timing acquired from the detection result by the acceleration sensor 17 is more significant than a predetermined blur state, the CPU 21 also performs post-processing (camera-shake processing: trimming processing in consideration of a blur) on images captured at capture timings before and after the capture timing for capturing the image in the correction range based on the blur state (more specifically, a range where processing is lighter in load than the pre-processing at the capture timing).

As a result, in interval capturing, while an effect of correcting a large blur is enhanced, the resolution with a small blur can be kept. Also, since smoothing processing for extending a correction range is performed on adjacent movies, a sense of incongruity due to different cut-out angles of view can be reduced.

By following the control of the CPU 13, the sound control section 23 converts audio (such as alarm sound) at the time of replaying the captured moving images to analog signals for output from the loudspeaker 24, and also digitalizes and captures environmental sounds collected by the microphone 25 at the time of capturing the moving images. The key operating section 22 inputs an operation mode and an operation instruction such as start capturing, pause, or stop, according to a touch operation of a user. The power supply (battery) 26 is a chargeable secondary battery. The power supply control section 27 stabilizes an output voltage of the power supply (battery) 26 and causes driving power to be supplied to each section.

B. Operation of Embodiment

Next, the operation of the above-described embodiment is described.

Figure 2:
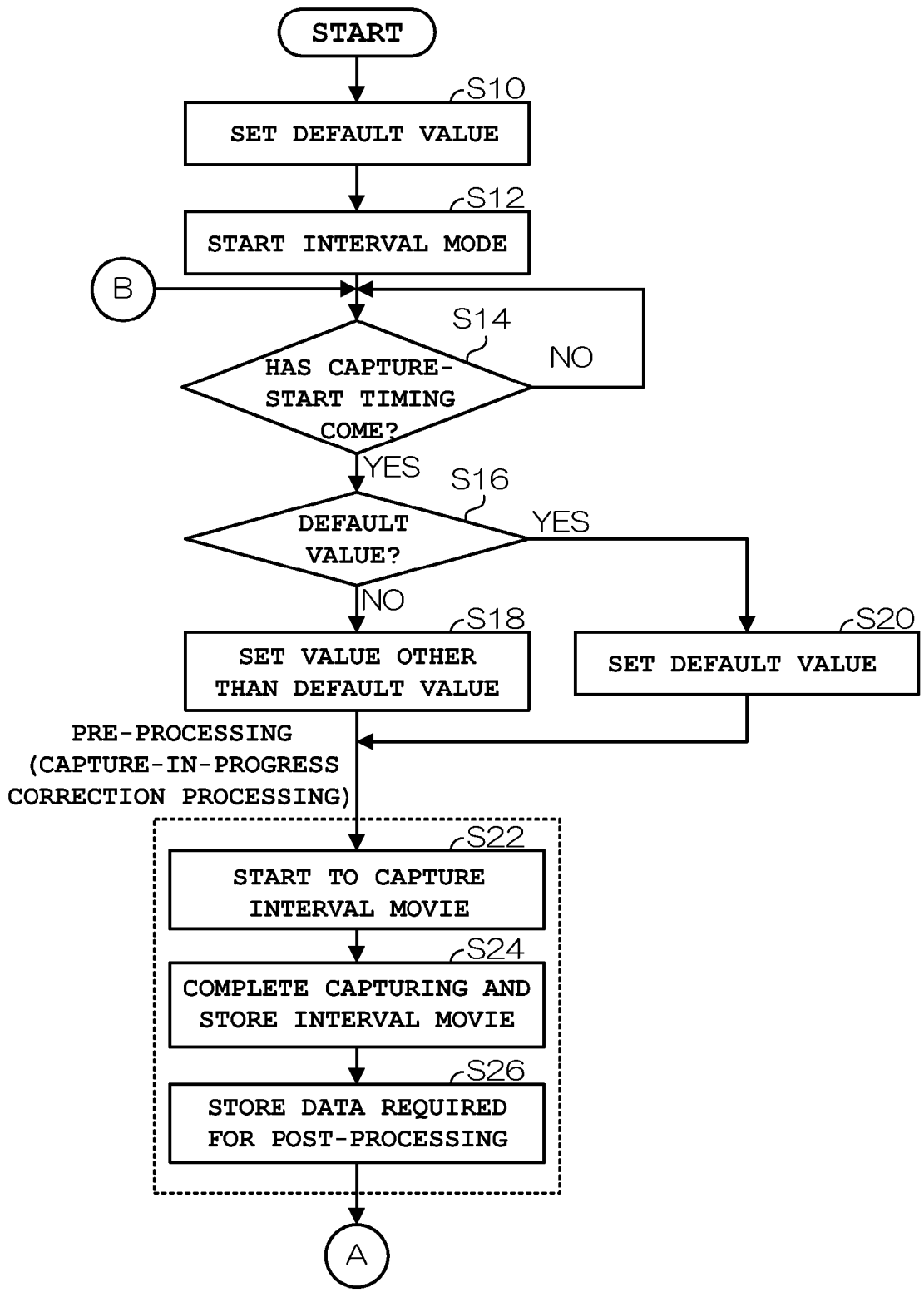
FIG. 2 is a flowchart for describing the operation of the imaging device 1 in the first embodiment.
Figure 3:
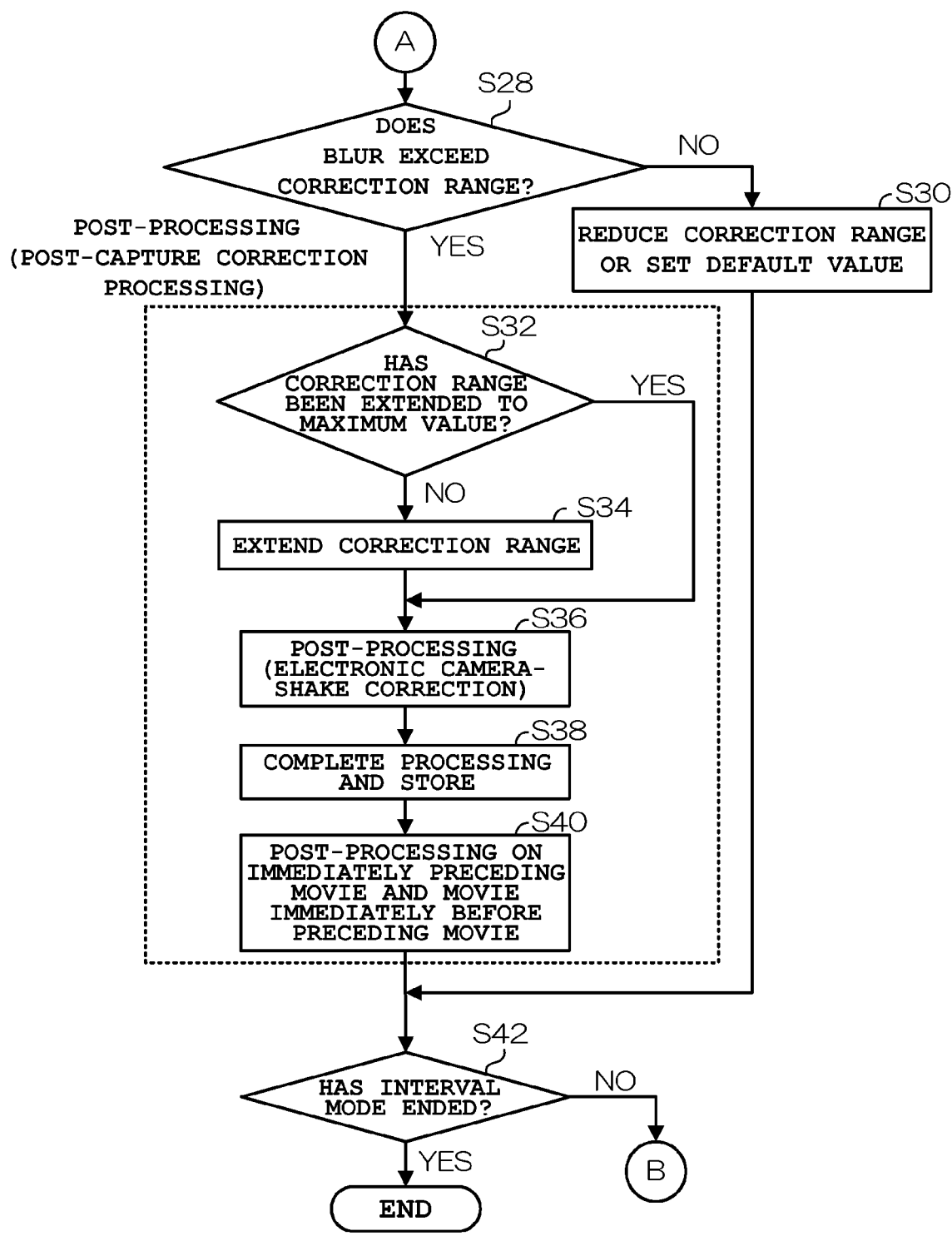
FIG. 3 is the flowchart for describing the operation of the imaging device 1 in the first embodiment.

FIG. 2 and FIG. 3 are flowcharts for describing the operation of the imaging device 1 according to the present embodiment. Here, mountain climbing, cycling, or the like is assumed as a photographic environment, and the installation place of the imaging device 1 and the photographic scene are the same but the photographic point is varied. Also, as interval capturing, movie capturing is assumed, with a capturing interval of five minutes or more and one capture on the order of five seconds.

First, the CPU 21 sets a default value as a camera-shake correction range (Step S10), and starts an interval mode (Step S12). The CPU 21 then judges whether a capture-start timing has come (Step S14). If the capture-start timing has not come yet (NO at Step S14), the CPU 21 becomes in a wait state. If the capture-start timing has come (YES at Step S14), the CPU 21 judges whether the correction range has the default value (Step S16). Here, if the correction range does not have the default value (NO at Step S16), the CPU 21 sets a value other than the default value (Step S18). On the other hand, when the correction range has the default value, (YES at Step S16), the CPU 21 sets the default value as the camera-shake correction range. Initially, the correction range is set at the default value.

Next, the CPU 21 performs pre-processing (capture-in-progress correction processing) at Step S22 to Step S26. First, the CPU 21 starts to capture an interval movie (Step S22) and stores the movie after the capturing is completed (on the order of five seconds) (Step S24). At the time of capturing an interval movie, the CPU 21 cuts out the angle of view from the captured interval movie to perform camera-shake correction. Next, as data required for post-processing, the CPU 21 acquires movement information (blur) at a capture timing from the detection result by the acceleration sensor 17, and stores the movement information in association with the captured image (Step S26).

Next, the CPU 21 judges whether the movement information (blur) exceeds the correction range (Step S28). When the movement information (blur) does not exceed the correction range (NO at Step S28), the CPU 21 reduces the camera-shake correction range or sets the default value, without performing post-processing, which will be described hereafter (Step S30). Next, the CPU 21 judges whether the interval mode has ended (Step S42). When the CPU 21 judges that the interval mode has not ended (NO at Step S42), the CPU 21 returns to Step S14 and repeats the processing described above.

On the other hand, when the movement information (blur) exceeds the correction range (YES at Step S28), the CPU 21 performs the post-processing (post-capture correction processing at Step S32 to Step S40. First, the CPU 21 judges whether the correction range of camera-shake correction has been extended to a maximum value (Step S32). If the correction range has not been extended to the maximum value yet (NO at Step S32), the CPU 21 extends the correction range of the camera-shake correction (Step S34), and then proceeds to Step S36. On the other hand, if the correction range has been extended to the maximum value (YES at Step S32), the CPU 21 directly proceeds to Step S36.

Next, the CPU 21 performs post-processing (electronic camera-shake correction) on an interval movie after the pre-processing with the extended correction range (Step S36), and stores the processing result after the processing is completed (Step S38). Specifically, the CPU 21 cuts out the angle of view from the interval movie after the pre-processing to perform camera-shake correction. Next, the CPU 21 also performs the post-processing (electronic camera-shake correction) on an immediately preceding interval movie and a movie immediately before the preceding interval movie with values based on the extended correction range (Step S40). Here, the following relation is satisfied: the "correction range on the immediately preceding interval movie is larger than the correction range on the movie immediately before the preceding interval movie".

As described above, the correction range is varied between the immediately preceding interval movie and the movie immediately before the preceding interval movie in order to reduce a sense of incongruity about the fluctuations of the angle of view due to the extension of the correction range. How previously movies are traced back to perform the post-processing is determined based on the degree of extension of the correction range and whether the post-processing has already been performed. At this moment, the CPU 21 does not have to store the processing result but merely temporarily retains the processing result because the immediately preceding interval movie may be again corrected in the next interval capturing. Next, the CPU 21 judges whether the interval mode has ended (Step S42). If the interval mode has ended (NO at Step S42), the CPU 21 returns to Step S14 and repeats the processing described above.

Figure 4:
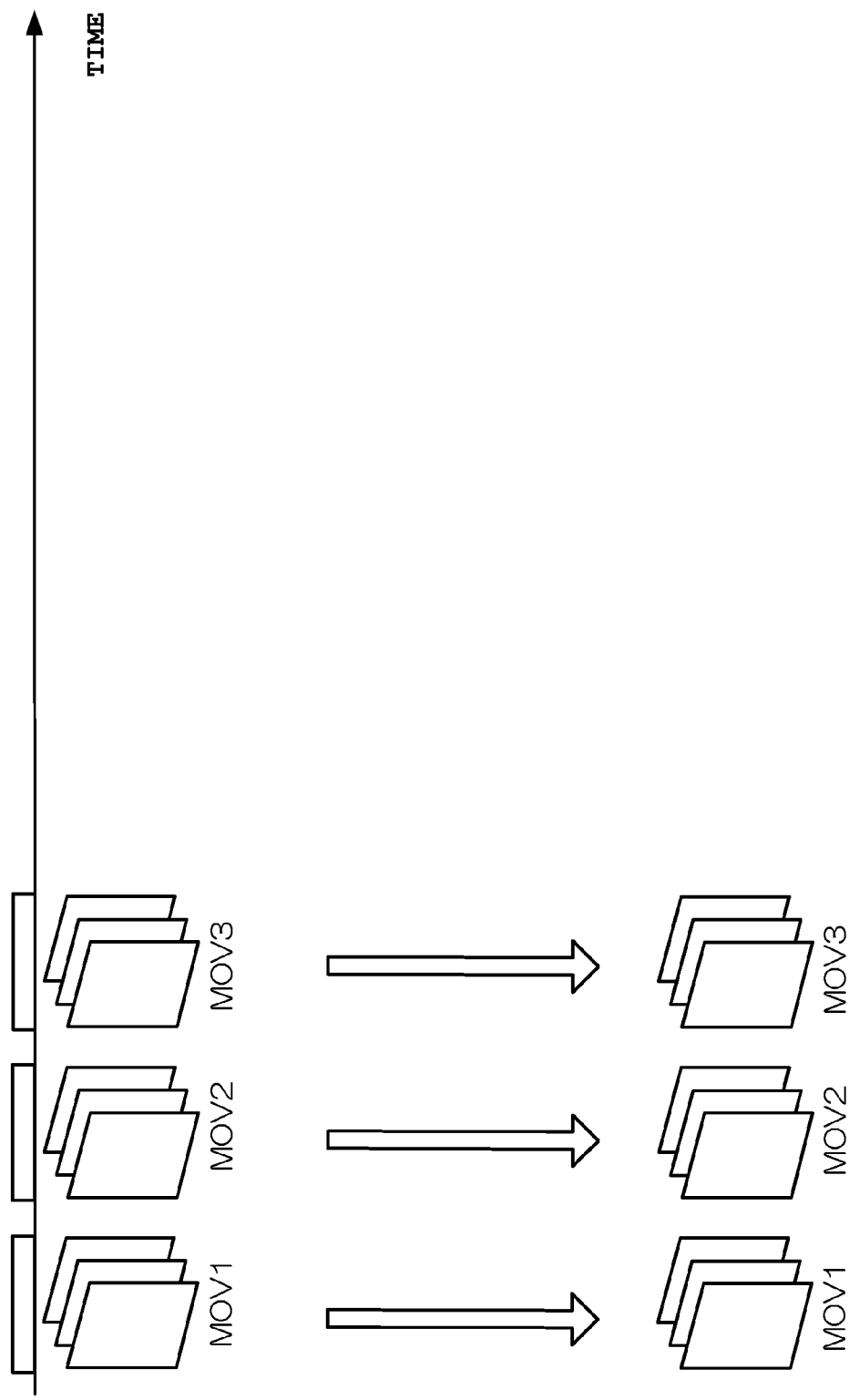
FIG. 4 is a sequence diagram for describing the operation of the imaging device 1 in the first embodiment.

FIG. 4 to FIG. 9 are sequence diagrams for describing the operation of the imaging device 1 according to the present embodiment. First, FIG. 4 depicts the state where interval capturing is performed and interval movies MOV1, MOV2, and MOV3 are captured. Pre-processing (capture-in-progress correction processing) is performed on any of these interval movies MOV1; MOV2, and MOV3 with a correction range of, for example, 5% (that is 5% of the entire imaging range is allocated as a correction margin). In this case, since it is found based on the detection result by the acceleration sensor 17 that a blur is not large, post-processing is not performed.

Figure 5:
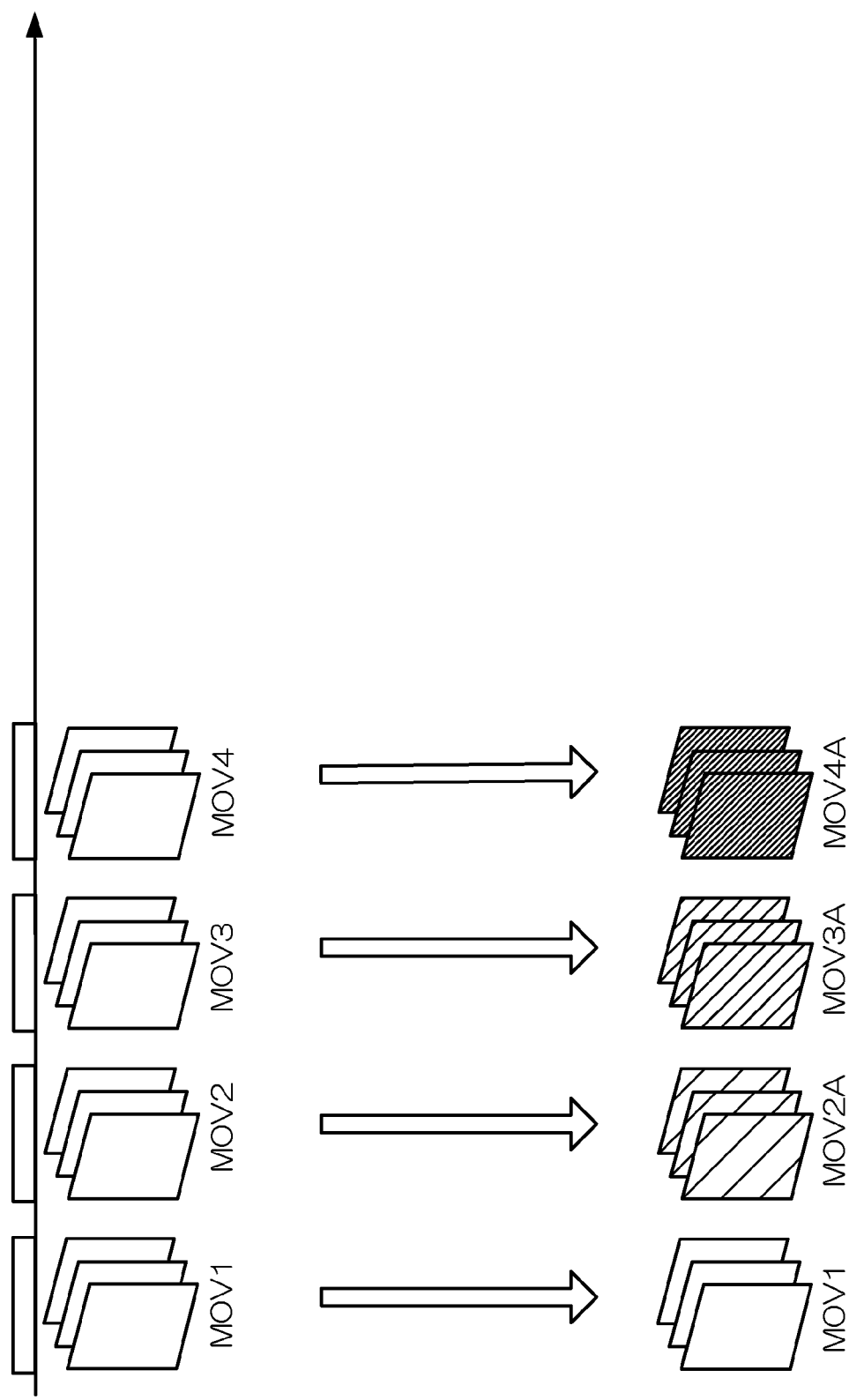
FIG. 5 is a sequence diagram for describing the operation of the imaging device 1 in the first embodiment.

FIG. 5 depicts the state where a new interval movie MOV4 is captured following the interval capturing of FIG. 4. Also in this case, pre-processing (capture-in-progress correction processing) is once performed on the interval movie MOV4 with the correction range of 5%.

Note that it is assumed that it is found based on the detection result by the acceleration sensor 17 at the time of capturing the interval movie MOV4 that a blur is large and the default correction range of 5% is not sufficient as the correction range.

In this case, post processing (electronic camera-shake correction) is performed on the interval movie MOV4 with a large blur, with a correction range of 10%, which is larger than the correction range of 5%, and an interval movie MOV4A is acquired. Also, post-processing (electronic camera-shake correction) is performed on the immediately preceding interval movie MOV3 with a correction range of 8%, and an interval movie MOV3A is acquired. Furthermore, post-processing (electronic camera-shake correction) is performed on the interval movie MOV2 immediately before the preceding interval movie MOV3 with a correction range of 6%, and an interval movie MOV2A is acquired. Still further, the correction range at the time of capturing the next movie (an interval movie MOV5) is set at 8%.

Figure 6:
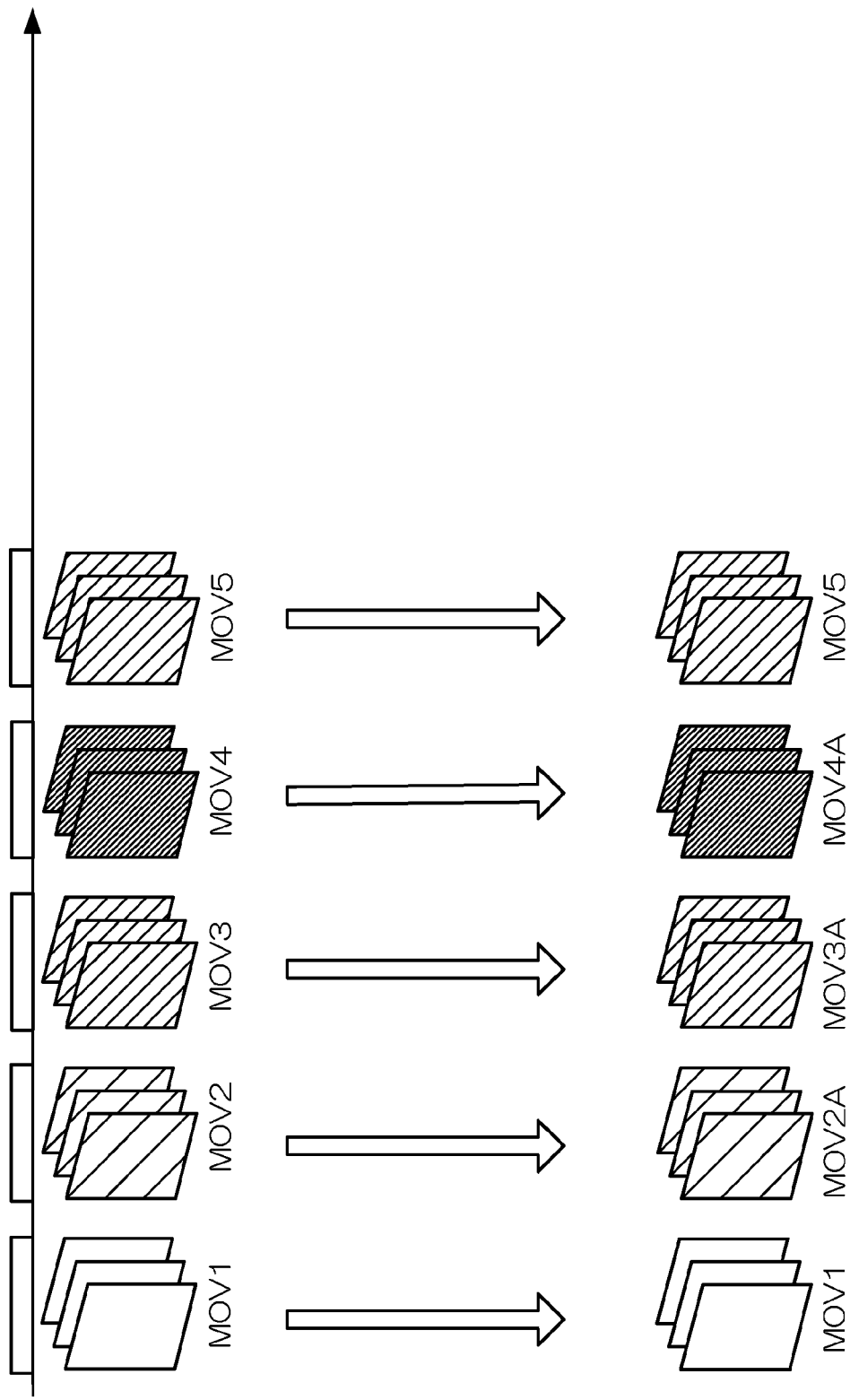
FIG. 6 is a sequence diagram for describing the operation of the imaging device 1 in the first embodiment.

Next, FIG. 6 depicts the state where the new interval movie MOV5 is captured following the interval capturing of FIG. 5. Also in this case, pre-processing (capture-in-progress correction processing) is once performed on the interval movie MOV5 with the previously-set correction range of 8%. Note that it is assumed that it is found based on the detection result by the acceleration sensor 17 at the time of capturing the interval movie MOV5 that a blur is small and the default correction range of 8% is sufficient. In this case, post-processing is not performed. Furthermore, the correction range at the time of capturing the next movie (an interval movie MOV6) is set at 6%.

Figure 7:
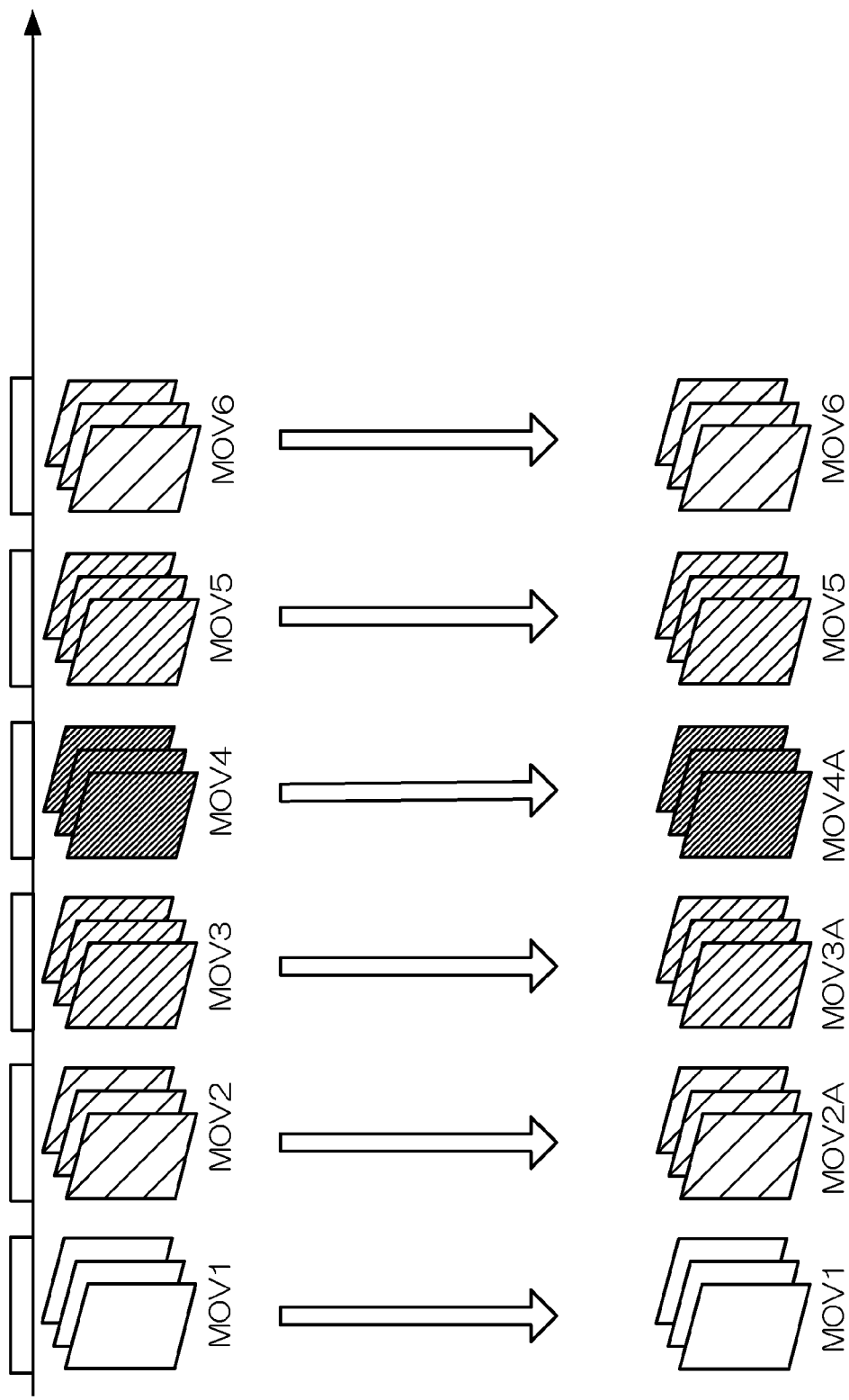
FIG. 7 is a sequence diagram for describing the operation of the imaging device 1 in the first embodiment.

Next, FIG. 7 depicts the state where the new interval movie MOV6 is captured following the interval capturing of FIG. 6. Also in this case, pre-processing (capture-in-progress correction processing) is once performed on the interval movie MOV6 with the previously-set correction range of 6%. Note that it is assumed that it is found based on the detection result by the acceleration sensor 17 at the time of capturing the interval movie MOV6 that a blur is small and the correction range of 6% is sufficient. In this case, post-processing is not performed. Furthermore, the correction range at the time of capturing the next movie (an interval movie MOV7) is set at 5%, the default value.

Figure 8:
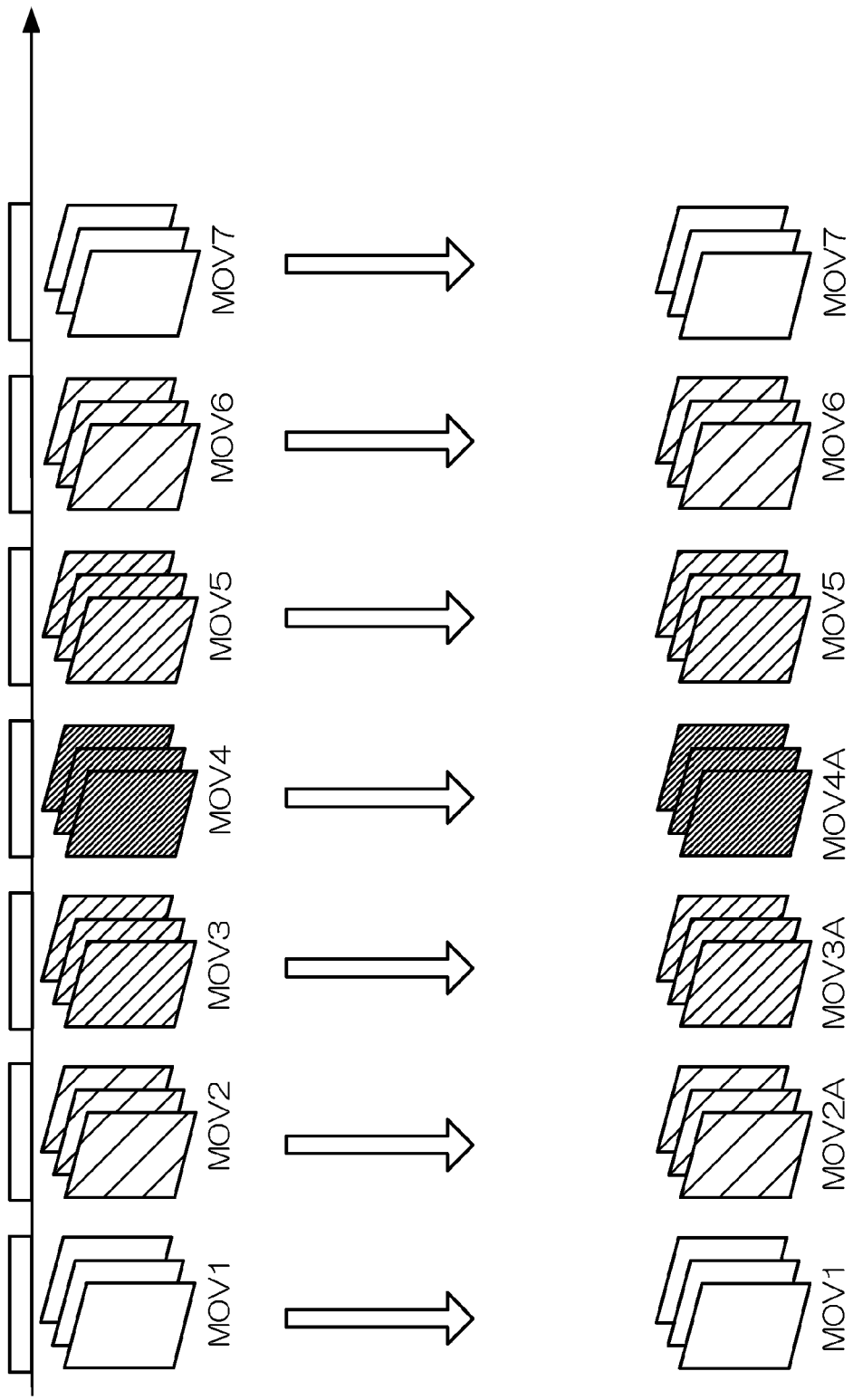
FIG. 8 is a sequence diagram for describing the operation of the imaging device 1 in the first embodiment.

Next, FIG. 8 depicts the state where the new interval movie MOV7 is captured following the interval capturing of FIG. 7. Also in this case, pre-processing (capture-in-progress correction processing) is once performed on the interval movie MOV7 with the previously-set correction range of 5%. Note that it is assumed that it is found based on the detection result by the acceleration sensor 17 at the time of capturing the interval movie MOV7 that a blur is small and the default correction range of 5% is sufficient. In this case, post-processing is not performed.

Figure 9:
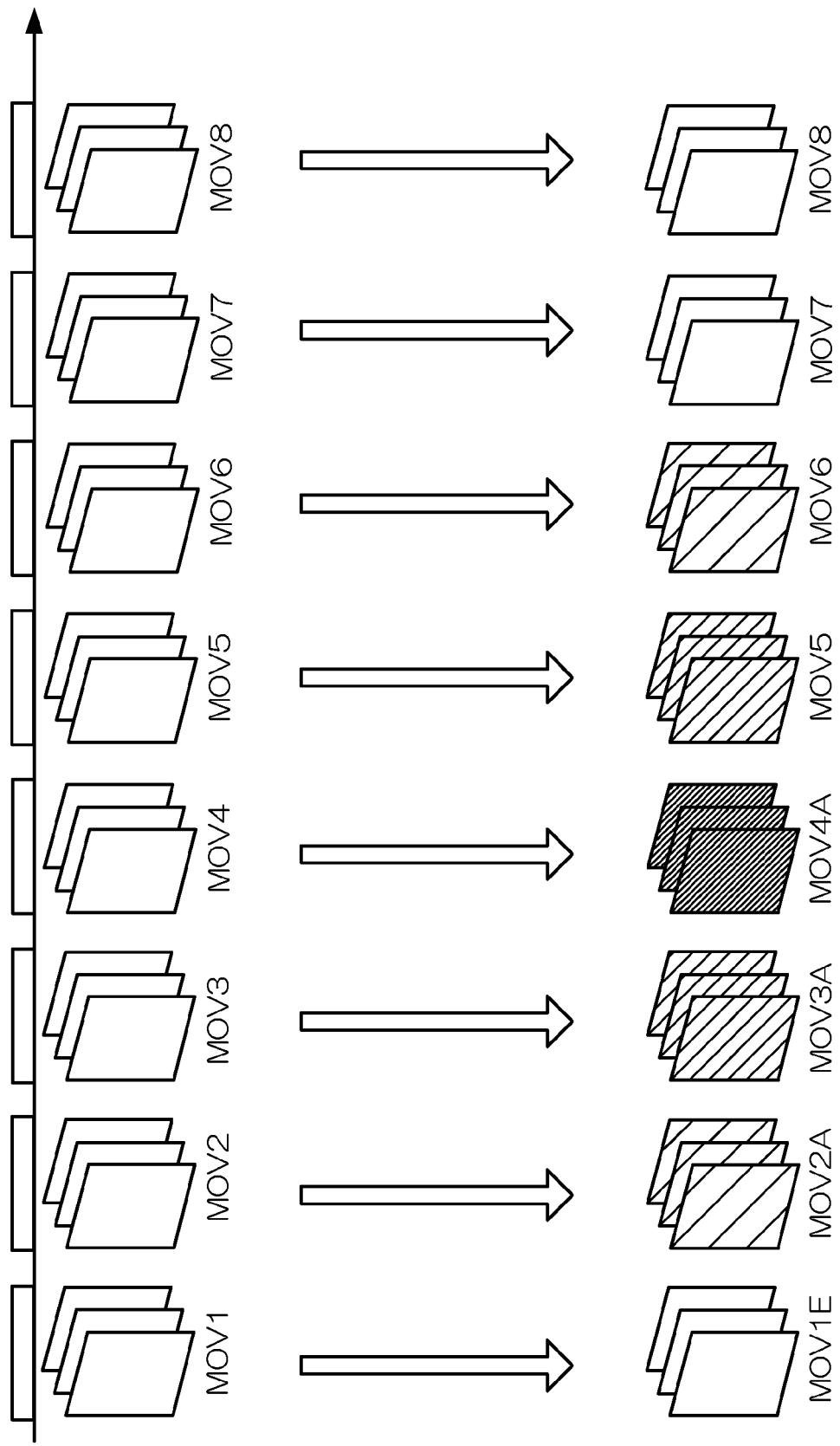
FIG. 9 is a sequence diagram for describing the operation of the imaging device 1 in the first embodiment.

Next, FIG. 9 depicts the state where a new interval movie MOV8 is captured following the interval capturing of FIG. 5. As depicted in FIG. 9, according to the present embodiment, it can be found that the correction range changes in a stepwise manner, with the interval movie MOV4 (correction range of 10%) having the largest blur at the center and then its preceding and subsequent interval movies MOV3 and MOV5 (correction range of 8%) and then its further preceding and subsequent interval movies MOV2 and MOV6 (correction range of 6%), and whereby a sense of incongruity about fluctuations of the angle of view can be reduced.

According to the embodiment described above, in interval capturing, pre-processing (camera-shake correction: trimming processing in consideration of a blur) is performed on the interval movie according to a correction range set corresponding to the previous blur state. When the blur state at the capture timing is more significant than a predetermined blur state, post-processing (camera-shake processing: trimming processing in consideration of a blur) is further performed on preceding and subsequent interval movies in that time sequence with a stepwise correction range. As a result, suitable interval images can be recorded even when being periodically captured while moving.

Also, according to the embodiment described above, pre-processing (camera-shake correction) is performed on an interval movie with a large blur by using the maximum correction range, and post-processing (camera-shake correction) is performed on its preceding and subsequent interval movies in that time sequence by using a correction range decreasing in a stepwise manner. This reduces a sense of incongruity about fluctuations of the angle of view.

Furthermore, according to the embodiment described above, a change of a correction margin of an effective imaging range (a margin at the time of trimming) is included in the setting of the correction range, and whereby a sense of incongruity about fluctuations of the angle of view can be reduced.

Still further, according to the embodiment described above, when the correction range in pre-processing (camera-shake correction) is smaller than a predetermined value, post-processing (camera-shake correction) is not performed, and whereby a sense of incongruity about fluctuations of the angle of view can be reduced.

Still further, according to the embodiment described above, the correction range in pre-processing (camera-shake correction) includes the effective imaging range, and whereby a sense of incongruity about fluctuations of the angle of view can be reduced.

Still further, according to the embodiment described above, the resolution of the interval movie is decreased in a stepwise manner by pre-processing (camera-shake correction) and post-processing (camera-shake correction), and whereby a sense of incongruity about fluctuations of the angle of view can be reduced.

Still further, according to the embodiment described above, imaging by the imaging section 11 is controlled so as to be performed at predetermined time intervals, and a blur at the time of imaging is detected by the acceleration sensor 17. Accordingly, suitable interval images can be recorded even when being periodically captured while a so-called digital camera is being moved.

In the present embodiment, an interval movie is captured for five seconds. However, the present embodiment is not limited thereto. A plurality of still images may be continuously captured at a predetermined frame rate, and these still images may be stored as a group (set) of continuous images. Alternatively, a predetermined number of still images may be continuously captured at any changeable frame rate, and these still images may be stored as a group (set) of continuous images.

The processing of the present embodiment in this case is assumed to be performed as correction processing when a plurality of still images continuously captured are sequentially displayed.

Second Embodiment

Configuration of Second Embodiment

Figure 10:
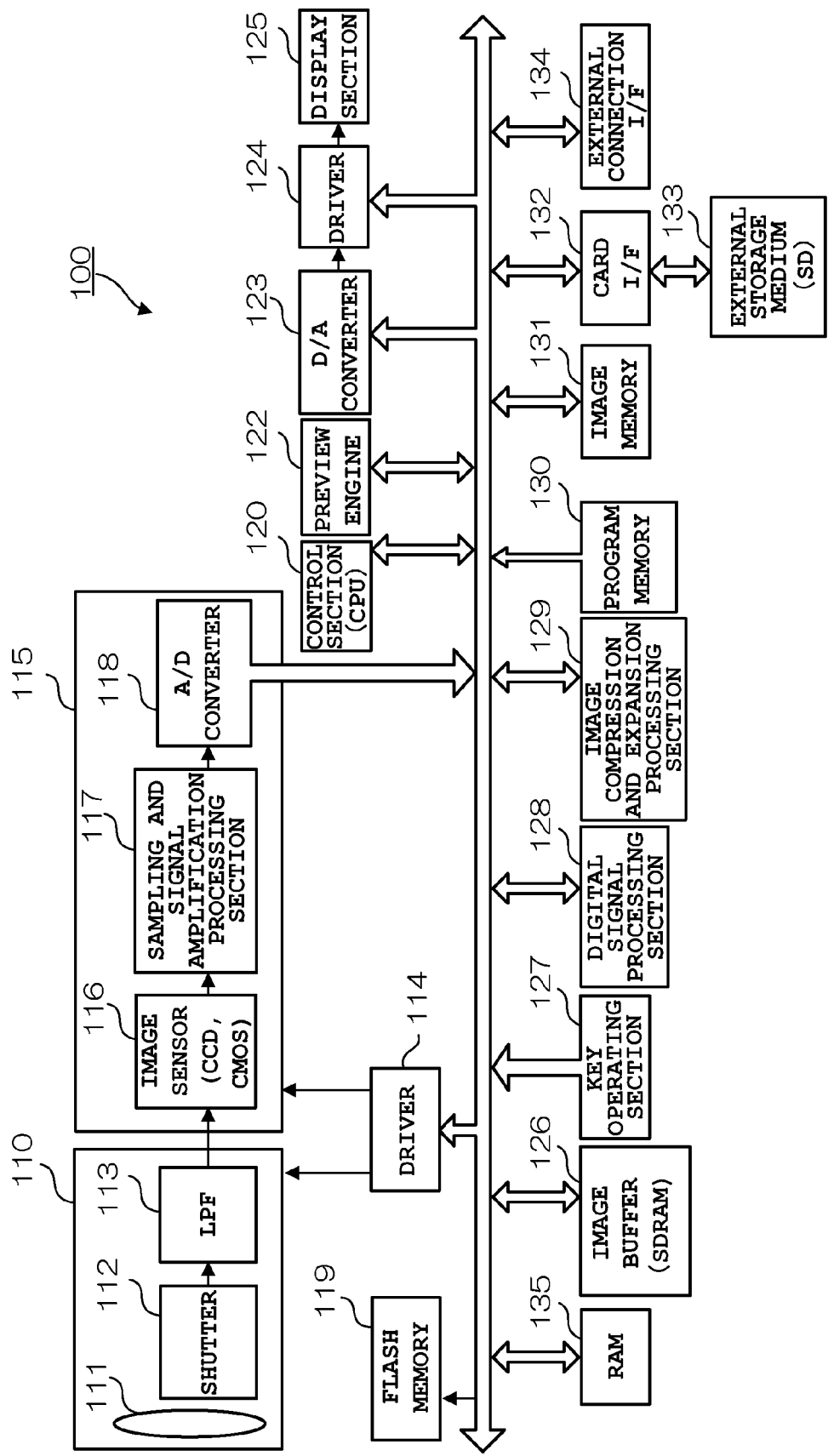
FIG. 10 is a block diagram of the configuration of an imaging device 100 in a second embodiment of the present invention.

FIG. 10 is a block diagram of the configuration of an imaging device 100 according to an embodiment of the present invention. In FIG. 10, an image acquiring section 110 includes a lens 111, a shutter 112, and an LPF (Low-Pass Filter) 113. The lens 111 is a normal optical lens, and includes a lens group in which aspherical lenses are stacked. The shutter 112 is a so-called mechanical shutter which is operated by a driver 114 driven by a control section 120 when a shutter button is operated. However, depending on the digital camera, a mechanical shutter may not be included. When the digital camera is of a type including a retractable lens structure or mechanical zoom, the driver 114 also drives and controls these features. The LPF 113 is a crystal low-pass filter provided to prevent the occurrence of moire.

An analog signal processing section 115 includes an image sensor (CCD or CMOS) 116, a sampling and signal amplification processing section 117, and an A/D (analog-to-digital) converter 118. The image sensor 116 forms a subject image (image) and converts the light intensity of each red, green, and blue (RGB) color into a current value. The sampling and signal amplification processing section 117 performs a correlated double sampling processing and a signal amplification processing to reduce noise and color unevenness. The A/D converter 118, also referred to as an analog front end, converts sampled or amplified analog signals to digital signals (converts signals for each RGB or CMYG color into 12-bit data and outputs the 12-bit data over a bus line).

Figure 11:
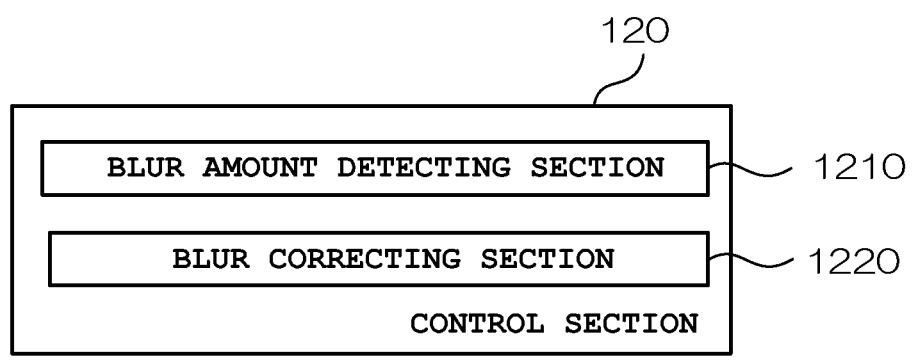
FIG. 11 is a block diagram of the configuration of a control section of the imaging device 100 in the second embodiment.

A control section (CPU) 120 runs programs stored in a program memory described hereafter and controls the overall imaging device 100. In the present embodiment, the control section 120 has a blur amount detecting section 1210 and a blur correcting section 1220, as depicted in FIG. 11. For example, at a stage before replaying moving-image data captured and stored in an image memory 131, which will be described hereafter, the blur amount detecting section 1210 detects a blur amount in each frame included in the moving-image data. The blur correcting section 1220 cuts out a partial image of a predetermined size from out of an image in each frame included in the moving-image data captured by imaging means, and also adjusts the position of each cut-out partial image according to the blur amount detected by the blur amount detecting section 1210 and whereby corrects the blur of the moving-image data. The control section 120 performs control of changing the predetermined size according to the blur amount detected by the blur amount detecting section 1210. Also, the blur correcting section 1220 enlarges or reduces each cut-out partial image of the predetermined size according to the change of the predetermined size controlled by the control section 120 so that the plurality of cut-out partial images of the predetermined sizes match in size with each other.

The control section 120 performs, for a first frame section where a blur amount equal to or larger than a first threshold is detected by the blur amount detecting section 1210, first control of determining a predetermined size, according to the blur amount detected by the blur amount detecting section 1210 corresponding to frames in the same first frame section. Also, the control section 120 performs, for a second frame section adjacent to the first frame section, second control, different from the first control, of determining a predetermined size according to the blur amount detected by the blur amount detecting section 1210 corresponding to frames not in the same second frame section but in the first frame section. Furthermore, the control section 120 performs, for a third frame section in which a blur amount smaller than the first threshold is detected, third control, different from the first control and the second control, of determining not a size according to the blur amount detected by the blur amount detecting section 1210 but a fixed size determined in advance as a predetermined size.

A preview engine 122 performs decimation processing for displaying in a display section 125 digital data inputted via the image acquiring section 110 and an analog signal processing section 115 in image recording mode (also referred to as recording mode or imaging mode), or digital data stored in an image buffer 126 and digital data stored in the image memory 131 immediately after the detection of a shutter operation. A D/A (Digital-to-Analog) converter 123 converts the digital data on which the preview engine 122 has performed the decimation processing, and outputs the converted digital data to a driver 124.

The driver 124 includes a buffer region for temporarily storing digital data displayed in the display section 125, and drives the display section 125 based on a control signal inputted via a key operating section and the control section 120. The display section 125 is formed of a color TFT (Thin-Film Transistor) liquid crystal, an STN (Super Twisted Nematic) liquid crystal, and displays a preview image, captured image data, a setting menu, etc.

The image buffer 126 temporarily stores digital data immediately after imaging which has been inputted via the analog signal processing section 115 or a digital signal processing section 128 until the digital data is sent to the digital signal processing section 128. The key operating section 127 includes a shutter button, a recording/replay mode selection slide switch, a menu button, a cross-shaped key (data enters when the center of the cross-shaped key is pressed), and the like.

The digital signal processing section 128 performs white balance processing, color processing, tone processing, edge enhancement, conversion from an RGB format to a YUV format, and conversion from a YUV format to a JPEG format on the digital data inputted via the analog signal processing section 115. An image compression and expansion processing section 129 compresses and encodes the digital data inputted via the digital signal processing section 128 into a JPEG format, generates a moving-image file of a motion JPEG format, and converts a moving-image file of a motion JPEG format to a moving-image file of an MPEG format and, in a replay mode, expands a moving-image file of a JPEG format, a motion JPEG format, or an MPEG format.

A program memory 130 stores various programs to be loaded to the control section 120, an EV value in a best shot function, color correction information, and the like. The image memory 131 stores image data temporarily retained in the image buffer 126, digital data and moving-image data converted to any of various file formats, and the like. A card I/F (Interface) 132 controls data exchange between an external storage medium 133 and a digital camera body.

The external storage medium 133 is a removable storage medium formed of a CompactFlash (registered trademark), memory stick, SD card, or the like. An external connection I/F 134 includes an USB connector slot and the like, is connected to a personal computer or the like, and is used for transferring captured image data, for example. A RAM (Random Access Memory) 135 stores various parameters necessary for control of the control section (CPU) 120, various parameters at the time of nightscape imaging (gain (ISO speed), aperture, shutter speed, a threshold for image combining, weight, and the like).

Operation of Second Embodiment

Figure 12:
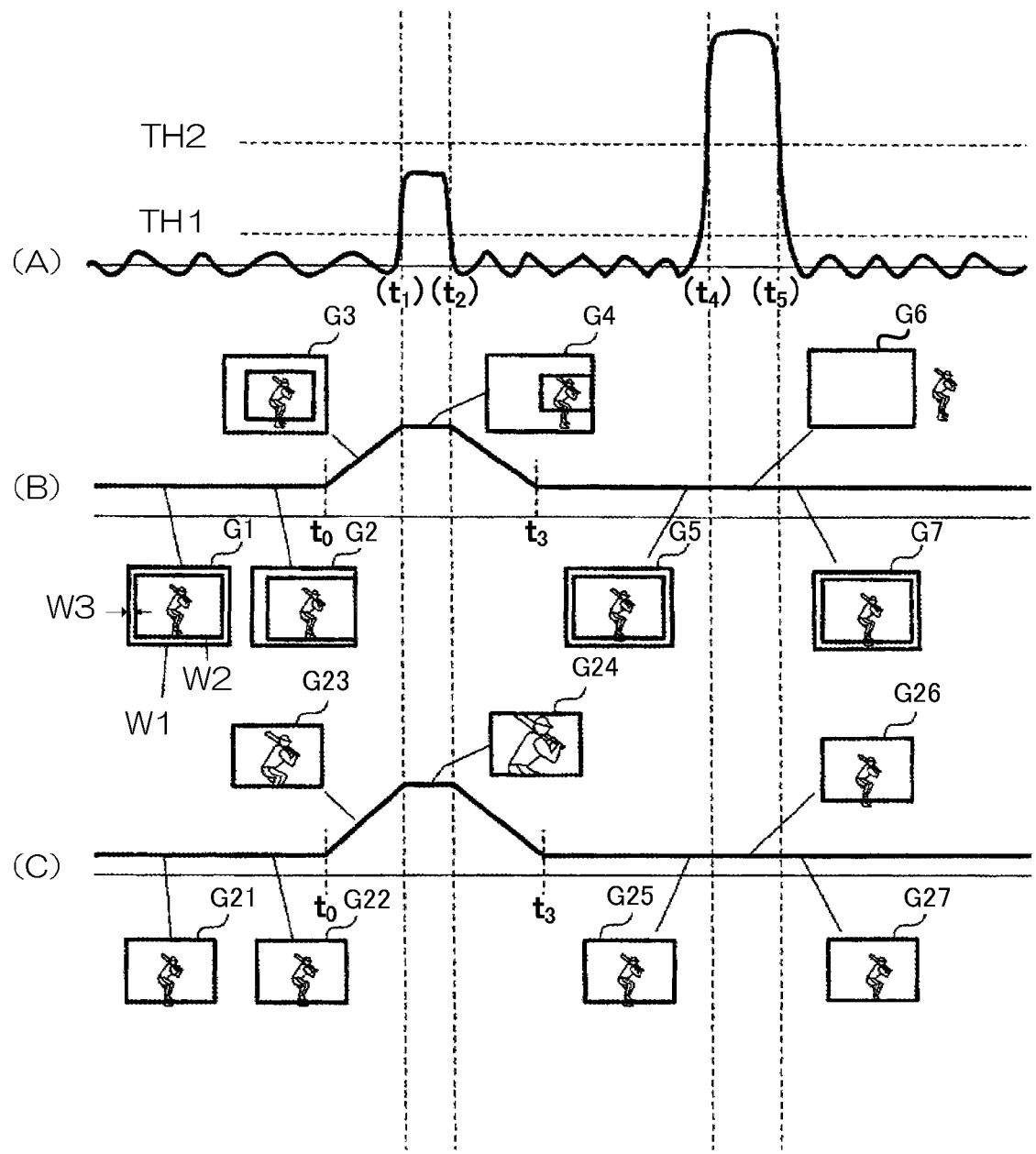
FIG. 12 is a conceptual diagram of blur correction processing of the imaging device 100 in the second embodiment.

The operation of the imaging device 100 according to the present embodiment depicted in FIG. 10 is described in detail hereinafter with reference to FIG. 12 and FIG. 13. First, moving-image blur correction of the present embodiment is schematically described with reference of a conceptual diagram depicted in FIG. 12. Portion (A) of FIG. 12 depicts a time chart representing a blur amount in each frame included in moving-image data to be corrected. The blur amount of the moving-image data to be corrected is detected by, for example, the blur amount detecting section 1210 (refer to FIG. 11). That is, the blur amount detecting section 1210 detects a blur amount totally in consideration of a moving amount of a main subject in a frame section of the moving-image data, a moving amount of a building, mountain, or the like in the background, etc. Portion (B) of FIG. 12 depicts a time chart representing a cut-out margin size W3 at the time of blur correction of the moving-image data depicted in Portion (A). In Portion (B), leader lines are drawn on the time chart, and frame images G1 to G7 before cutout at timings at starting points of the leader lines are exemplarily depicted. Portion (C) of FIG. 12 depicts a time chart of a digital zoom magnification at the time of blur correction of the moving-image data depicted in Portion (A). In Portion (C), leader lines are drawn on the time chart, and frame images G21 to G27 cut out at timings at starting points of the leader lines are exemplarily depicted.

In Portion (A), the moving-image data to be corrected (for example, moving-image data stored in the image memory 131) is compared with a first threshold TH1 and a second threshold TH2, which are blur amounts set in advance as thresholds. Here, the first threshold TH1 is a value corresponding to a blur amount that can specify a "blur" in which, for example, the state where a subject (a baseball batter in this example) is at the center as shown in the frame image G1 is changed to the state where the subject is moved to the right end of the frame as shown in the frame image G4 (however, the first threshold TH1 is smaller than the second threshold TH2, which will be described hereafter). The second threshold TH2 is a value corresponding to a blur amount that can specify a "blur" in which, for example, the imaging state of the frame image G1 is changed to the state where the subject goes out of the frame as shown in the frame image G6.

In a state where the above-described first threshold TH1 and second threshold TH2 has been set, when a frame section (for example, a frame section before a time t0) in which a "blur" smaller than the first threshold TH1 is detected is specified in the moving-image data to be corrected, the control section 120 performs blur correction of merely cutting out an image of a fixed size W1 around the subject from each frame regardless of the blur amount in that frame section (referred to as a third frame section for convenience) and adjusting the position with the size unchanged. In the example of FIG. 12, in the frame section before the time t0, for example, the frame image G1 where a "blur" is not present and the frame G2 where a slight blur to the right is present are both cut out as images G21 and G22 of the same size, and blur correction is made after positional adjustment. This blur correction processing is generally-performed processing.

In the moving-image data to be corrected (refer to Portion (A) of FIG. 12), when a frame (a frame between a time t1 and a time t2) where a "blur" equal to or larger than the first threshold TH1 and smaller than the second threshold TH2 is detected is specified, the control section 120 performs blur correction of that frame section (referred to as a first frame section for convenience). In the example of FIG. 12, an image near the subject deviated to the right end of the frame image G4 is cut out in a small size corresponding to the blur amount in the first frame section (the section between the time t1 and the time t2) (refer to Portion (B)), the cut-out image is enlarged to be, for example, three times, larger than the cut-out size (refer to Portion (C)), and blur correction is made after positional adjustment.

Furthermore, in the present embodiment, when the first frame section where a blur amount equal to or larger than the first threshold TH1 and smaller than the second threshold TH2 is detected is specified, the control section 120 performs processing of changing the length of frame sections preceding and subsequent to the first frame section (between the time t0 and the time t1 and between a time t2 and a time t3), according to the blur amount in the first frame section.

The control section 120 then performs control, as second control, of changing the predetermined size in both of the length-changed preceding and subsequent frame sections (referred to as second frame sections for convenience) such that, for example, as the frame section is closer the first frame section, the size of the image cut out from a relevant frame gradually increases (note that a maximum size is the same as that of the first frame section) (in other words, as the frame section is far away from the first frame section, the size gradually decreases (note that a minimum size is the same as that of the third frame section)).

By this processing, in the second frame section from the time t0 to the time t1, the size of an image cut out from each frame is adjusted to be gradually increased from unity magnification to threefold (in this example, an image cut out from the frame image G3 is adjusted to be doubled in size to become an image G23). Next, in the first frame section from the time t1 to the time t2, the control section 120 maintains an image cut out from each frame to be threefold in size. Furthermore, in the second frame section from the time t2 to the time t3, the control section 120 adjusts an image cut out from each frame to be gradually decreased from threefold to unity magnification.

As a result, a size W2 of the cut-out image is gradually changed from the time t0 to the time t3, and whereby continuity is kept.

When a frame section where a blur amount equal to or larger than the second threshold TH2 is detected (a section between a time t4 and a time t5) is specified, in that frame section (referred to as a fourth frame section for convenience), the subject is deviated enough to be out of the frame, as shown in the frame image G6, for example, and whereby blur correction by cutting out an area of the subject and performing size adjustment cannot be performed.

In this case, instead of performing blur correction by the blur correcting section 1220, the control section 120 performs frame interpolation processing of discarding each frame in the fourth frame section and cutting out an image from the frame image G5 in the preceding frame section or the frame image G7 in the subsequent frame section and embedding the cut-out image G26 as an image in the frame section with its magnification unchanged (unity magnification) for interpolation.

According to the frame interpolation processing, replay of useless images in which the subject is not present can be eliminated, and unnatural replay can be avoided.

In consideration of the schematic description of blur correction based on FIG. 12, the operation of blur correction processing according to the present embodiment is described in detail hereafter. FIG. 13 is a flowchart of the operation of blur correction processing at the time of replying moving images according to the second embodiment.

When the user uses the key operating section 127 of the imaging device 100 (refer to FIG. 10) to set a moving-image replay mode, selects a moving image to be replayed, and operates to start replay, the control section 120 reads out data of the selected moving image from the image memory 131 and temporarily stores the read out data in the image buffer 126.

Figure 13:
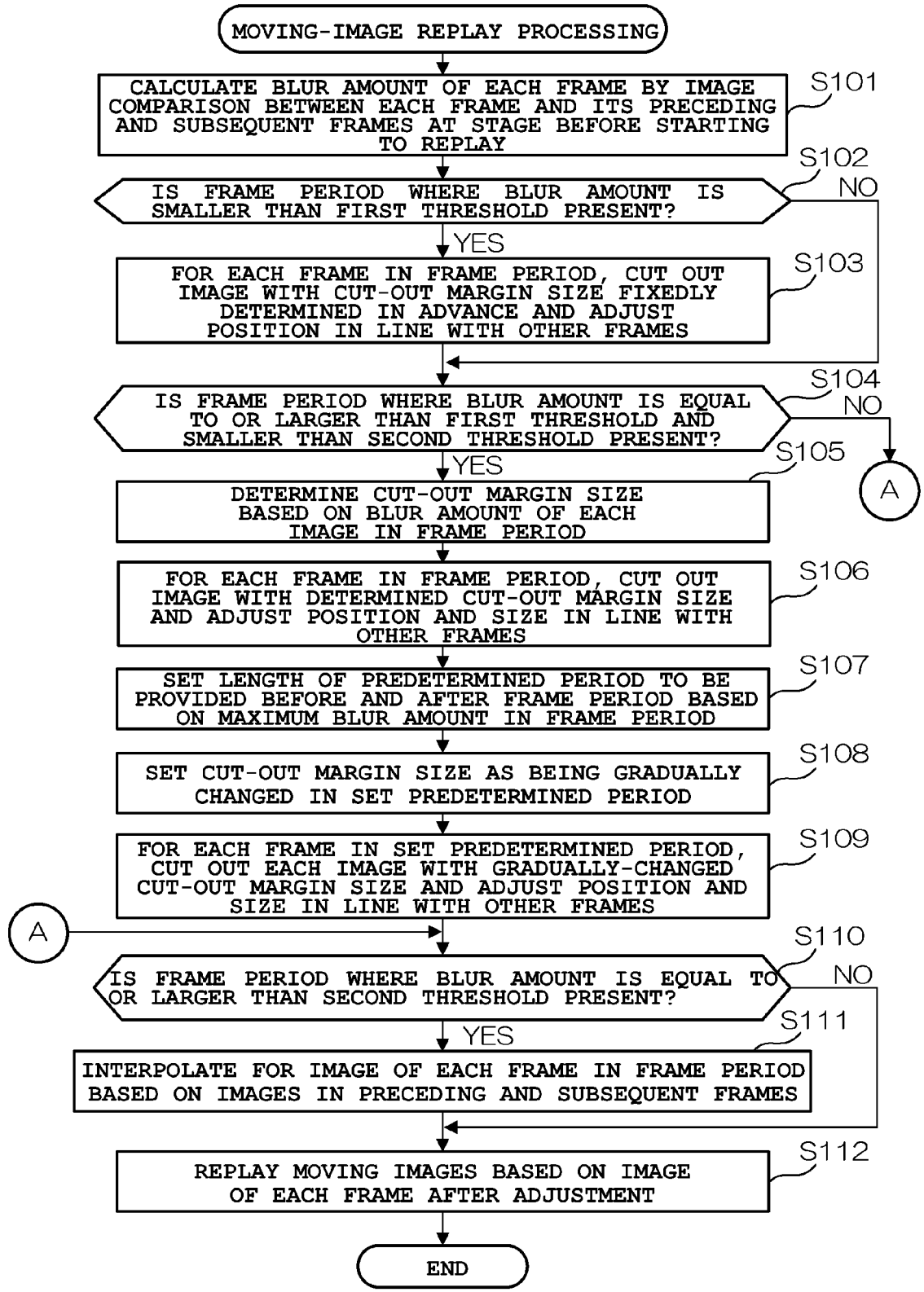
FIG. 13 is a flowchart of blur correction processing at the time of replying moving images by the imaging device 100 in the second embodiment.

Then, the control section 120 performs blur correction processing on the replay image data stored in the image buffer 126 by the blur amount detecting section 1210 and the blur correcting section 1220 until the moving-image data is replayed at Step S112 of FIG. 13. Note that the first threshold TH1 and the second threshold TH2 for judging the magnitude of the blur amount are set in advance in order to perform the blur correction processing. Here, the first threshold TH1 and the second threshold TH2 are exemplarily depicted in FIG. 12.

The first threshold TH1 is a value corresponding to a blur amount that cannot be sufficiently corrected by normal blur correction processing of merely cutting out an image of the fixed size W1 and adjusting the position of the cut-out image (refer to Step S103).

The second threshold TH2 is a value larger than the first threshold TH1 and corresponding to, for example, a "blur" when the photographer loses sight of the subject and tries to find the subject, resulting in a large momentary disturbance of the image, or a "blur" when the photographer inadvertently touches the imaging device 100 with his or her finger or when an image irrelevant to the series of images is abruptly captured.

Upon the start of the blur correction processing, the blur amount detecting section 1210 reads out the moving-image data to be replayed from the image buffer 126. While sequentially reading out attention frames to which attention to be paid for blur amount detection, the blur amount detecting section 1210 calculates a blur amount of each attention frame by image comparison between an attention frame and its preceding and subsequent frames (Step S101).

The blur correcting section 1220 monitors the blur amount calculated (detected) by the blur amount detecting section 1210 and judges whether a frame period where a blur amount smaller than the first threshold TH1 set in advance is detected is present (Step S102). Here, when a frame period where a blur amount smaller than the first threshold TH1 is detected is not present (NO at Step S102), the control section 120 proceeds to Step S104.

On the other hand, when a frame period where a blur amount smaller than the first threshold TH1 is detected is present (YES at Step S102), the control section 120 cuts out an image of the cut-out margin size W3 fixedly determined in advance for each frame in the relevant frame period, and also adjusts the position in line with other frames (Step S103).

The blur correction processing is normally-applied processing on a moving image with a small "blur".

Next, the blur correcting section 1220 judges whether a frame period with a blur amount detected (calculated) by the blur amount detecting section 1210 equal to or larger than the first threshold TH1 and smaller than the second threshold TH2 is present (Step S104). Here, when a frame period with a blur amount equal to or larger than the first threshold TH1 and smaller than the second threshold TH2 is not present (NO at Step S104), the control section 120 proceeds to processing at Step S110, which will be described hereafter.

On the other hand, when a frame period with a blur amount equal to or larger than the first threshold TH1 and smaller than the second threshold TH2 is present (YES at Step S104), the control section 120 determines the cut-out margin size W3 based on the blur amount of each frame in the frame period (Step S105).

Next, the control section 120 cuts out an image with the cut-out margin size W3 determined according to the blur amount in the frame period when it is detected at Step S105 for each frame in the frame period that the blur amount is equal to or larger than the first threshold TH1 and smaller than the second threshold TH2, and adjusts the position and size of the image in line with other frames (in balance with the positions and sizes of other frames) (Step S106).

Furthermore, the control section 120 detects a maximum blur amount in the frame period, and sets the length of a predetermined period to be provided before and after the frame period based on the detected maximum blur amount (Step S107). The control section 120 sets the cut-out margin size W3 as being gradually changed in the set predetermined period (Step S108).

The control section 120 then cuts out each image with the gradually-changed cut-out margin size W3 for each frame in the predetermined period set at Step S108 and adjusts the position and size in line with other frames (Step S109).

After blur correction (Steps S105 to S109) in the frame period where a blur amount equal to or larger than the first threshold TH1 and smaller than the second threshold TH2 is detected is performed as described above, the control section 120 judges whether a frame period with a blur amount detected at Step S101 equal to or larger than the second threshold TH2 is present (Step S110).

Here, when it is judged that a frame period with a blur amount equal to or larger than the second threshold TH2 is present (YES at Step S110), the control section 120 performs processing of discarding each frame in the frame period with a blur amount equal to or larger than the second threshold TH2 and interpolating for the each discarded frame image based on the preceding and subsequent frame images (Step S111).

The blur-corrected image data in the image buffer 126 with "blurs" of the blur amount smaller than the first threshold TH1, the blur amount equal to or larger than the first threshold TH1 and smaller than the second threshold TH2, and blur amount equal to or larger than the second threshold TH2 being respectively corrected as described above (Steps S103, S105 to S109, and S111) is sent to the driver 124.

The driver 124 temporarily stores the received data in a buffer region, reads out the blur-corrected moving-image data from the buffer region, and displays the read-out data as replay moving images on the display section 125 (Step S112). The image data with "blurs" corrected by the blur correction processing up to Step S111 may be returned to (stored in) the image memory 131 and then the blur-corrected moving-image data may be directly read out from the image memory 131 for replay.

Effect of Second Embodiment

As described above, according to the moving-image capturing device (imaging device 100) of the second embodiment, the control means (the blur correcting section 1220) specifies the first frame section where a blur amount equal to or larger than the first threshold TH1 and smaller than the second threshold TH2 is detected by the detecting means (the blur amount detecting section 1210) and performs, for the first frame section and second frame sections preceding and subsequent to the first frame section, first blur correction processing of cutting out an image with a size corresponding to the blur amount detected by the detecting means for the first frame section in frames in the first and second frame sections, and adjusting the position and size of each of the cut-out images in line with other frames, as depicted in FIG. 13 (refer to Step S104 to Step S109). As such, by performing blur correction not only on a frame where a large "blur" is detected but also on frames preceding and subsequent to the frame, the following problem can be avoided: continuity of moving images is impaired because of an abrupt change in the enlargement ratio according to the change of the cut-out size W2 in the frame section where the large "blur" is corrected. The problem has been significant in the conventional technology in which a frame where a large "blur" is detected is cut out to be of a small size and enlarged with a large magnification ratio to correct the "blur".

According to the present invention, effects recited below can be further acquired.

(1) By interpolating, for a frame where a large "blur" is detected in which the subject momentarily disappears and is captured thereafter, an image cut out from an adjacent frame where the subject is present, natural replay images can be viewed.

(2) The length of the second frame section is changed according to the blur amount in the first frame section, and natural replay images with the size gradually changed can be viewed.

(3) Blur correction in the second embodiment can be applied both at the time of replaying captured moving images and at the time of capturing moving images. By performing blur correction at the time of capturing and then storing the result in the image memory, blur correction processing is not required at the time of replay.

(4) Correction can be made also on a "blur" in which an image slowly moves to one direction and then greatly and slowly moves to a reverse direction and which cannot be corrected in real time at the time of normal capturing.

First Modification Example of Second Embodiment

In the second embodiment, an image is cut out with the cut-out margin size W3 in the first frame section based on the blur amount in the first frame section detected by the blur amount detecting section 1210. Alternatively, it may be configured such that the user can arbitrarily set a cut-out margin size (reduction level: blur correction level) W3 at the time of replaying moving images.

This configuration can be achieved by, for example, displaying a setting screen on the display section 125 and accepting an instruction for the above-described setting by using the setting screen after a moving-image generation mode is set and before a replay start operation is performed (before proceeding to Step S101)

According to this configuration, the user can arbitrarily set a change of the size for blur correction of a section with a large blur amount.

Second Modification Example of Second Embodiment

Also, in the setting screen described in the first modification example of the second embodiment, it may be configured to be able to set whether blur correction is performed on a moving image with a large "blur" (a "blur" corresponding to the first threshold TH1) and whether blur correction is performed on a useless image (an image with a "blur" corresponding to the second threshold TH2).

The processing of setting whether to perform these corrections described above may be configured to be able to be performed at the time of capturing moving images. According to this configuration, the user can arbitrarily set a type of "blur" to be corrected.

Third Embodiment

Configuration of Third Embodiment

In the second embodiment described above, blur correction processing is performed at the time of replaying moving images. In a third embodiment, blur correction processing is performed at the time of capturing the moving images.

When blur correction is performed at the time of capturing moving images, data to be corrected is merely changed from the captured moving image data described in the above-described embodiment to moving image data being captured. Accordingly, the configuration of the control section 120 depicted in FIG. 11 can be used for the processing of correcting a blur of the moving image data.

Other configurations in the imaging device 100 depicted in FIG. 10 can also be used in the present embodiment.

Operation of Third Embodiment

FIG. 14 is a flowchart of operation of blur correction processing at the time of capturing moving images according to the present embodiment. Hereinafter, the blur correction processing according to the present embodiment is described with reference to FIG. 14.

In order to capture moving images, the mode is set at moving-image capturing mode, and then a capture start operation is performed. When a capture start operation is performed, photoelectric conversion output of moving images captured by the image sensor 116 are subjected to sampling and amplification processing by the sampling and signal amplification processing section 117, and are further subjected to digital conversion by the A/D converter 118 for output to the bus line. In the third embodiment, the control section 120 temporarily stores a digital signal (moving-image data) outputted from the A/D converter 118 in the image buffer 126 before stored in the image memory 131, and performs blur correction processing depicted in FIG. 14 on the stored moving-image data. Note that, to perform this correction processing, it is assumed that, as with the second embodiment, the first threshold TH1 and the second threshold TH2 are set in advance.

In the third embodiment, when blur correction processing is started, the blur amount detecting section 1210 reads out moving-image data (moving-image data being captured) before the moving-image data is sent from the image buffer 126 via the digital signal processing section 128, etc., to the image memory 131. While sequentially reading out attention frames to which attention to be paid for blur amount detection, the blur amount detecting section 1210 calculates a blur amount of each attention frame by image comparison between the attention frame and its preceding and subsequent frames (Step S201).

The blur correcting section 1220 then monitors the blur amount calculated (detected) by the blur amount detecting section 1210, specifies a frame period where a blur amount smaller than the first threshold TH1 set in advance is detected, a frame period where a blur amount equal to or larger than the first threshold TH1 and smaller than the second threshold TH2 is detected, and a frame period where a blur amount equal to or larger than the second threshold TH2 is detected, and performs blur correction processing at Steps S202 to S211 on frames of each of these sections.

Here, the processing at Steps S202 to S211 is similar to the processing at Steps S102 to S111 in the second embodiment (refer to FIG. 13), and its detailed description is omitted.

At Step S211 of FIG. 14, the control section 120 performs interpolation processing on the image in the frame period where a blur amount equal to or larger than the second threshold TH2 is detected. Then, the control section 120 performs digital signal processing by the digital signal processing section 128 based on the moving-image data subjected to blur correction (adjusted in size, position, etc.) and the like. And then, the control section 120 generates blur-corrected moving-image data, and stores the blur corrected moving-image data in the image memory 131 (Step S212).

Effect of Third Embodiment

As described above, according to the moving-image imaging device (the imaging device 100) of the third embodiment, at the time of capturing moving images, moving-image data is buffered; blur correction is performed on the captured moving-image data; and the corrected moving-image data stored in the image memory 131. Even if a moving image with a large "blur" is captured at the time of capturing, the moving image with the "blur" corrected can be stored in the image memory. At the time of replaying the moving-image data, images without a large "blur" can be replayed without performing blur correction processing.

Fourth Embodiment

Configuration of Fourth Embodiment

In the above-described second and third embodiments, a blur amount in each frame is detected from the moving-image data to be subjected to blur correction at the time of replaying or capturing moving images. A fourth embodiment includes a detector such as an acceleration/gyro sensor which detects a blur amount (vibration) of the device body and association means which stores the moving-image data in association with blur amounts detected by the detector, for each frame in the moving-image data captured by the imaging means. When the moving-image data in association with the blur amounts is replayed, the blur amount detecting section 1210 of the control section 120 reads out the blur amount for each frame in association with the moving-image data and detects the blur amount of the image data for each frame. Based on the blur amounts read out by the blur correcting section 1220, the blur correcting section 1220 then performs blur correction processing by specifying a frame period where a blur amount smaller than the first threshold TH1 is detected, a frame period where a blur amount equal to or larger than the first threshold TH1 and smaller than the second threshold TH2 is detected, and a frame period where a blur equal to or larger than the second threshold TH2 is detected.

Effect of Fourth Embodiment

As such, the fourth embodiment has a feature in which moving-image data captured by the imaging means (the image sensor 116) is stored in association with a blur amount detected by the detector which detects a blur amount of the device (the imaging device 100) body, and the detecting means (the blur amount detecting section 1210) detects a blur amount of the moving-image data to be corrected based on the blur amount (of the device body) in association with the moving-image data.

According to the configuration of the present embodiment, by using "blur" detected by a blur detection sensor such as a gyro sensor, images with a large "blur" corrected can be replayed.

A moving-image blur correction method according to the present embodiment is applied to, for example, the imaging device 100 depicted in FIG. 10. For example, in FIG. 13, the moving-image blur correction method includes a first step of detecting a blur amount of moving-image data captured by the imaging means (the image sensor 116) of the imaging device 100 (Step S101 of FIG. 13) and a second step of specifying a first frame section where a blur amount equal to or larger than the predetermined first threshold TH1 and smaller than the predetermined second threshold TH2 is detected at the first step, cutting out, for the first frame section and second frame sections preceding and subsequent to the first frame section, an image with a size corresponding to the blur amount detected for the first frame section at the first step in frames in the first and second frame sections, and adjusting the position and size of the cut-out image in line with other frames (Steps S104 to S109 of FIG. 13).

As such, blur correction is performed not only on a frame where a large "blur" is detected but also on frames preceding and subsequent to the frame. Thus, a moving-image capturing method can be provided that continuous moving images can be viewed without an abrupt change in the magnification ratio of the images cut out for correction even when a large "blur" is present in the captured moving images.

Also, the moving-image blur correction program according to the present embodiment is a program implemented on, for example, the program memory 130, of the imaging device 100 and executed by a computer (for example, the control section 120 of FIG. 10). The program causes the computer to perform processing of detecting a blur amount of moving-image data captured by the imaging means (the image sensor 116) of the imaging device 100 (Step S101 of FIG. 13) and blur correction processing of specifying a first frame section where a blur amount equal to or larger than the predetermined first threshold TH1 and smaller than the predetermined second threshold TH2 by the detection processing, cutting out an image with a size corresponding to the blur amount detected in the first frame section by the detection processing from the first frame section and second frame section preceding and subsequent to the first frame section, and adjusting the position and size of the cut-out image in line with other frames (Steps S104 to S109 of FIG. 13).

In the imaging device 100, the control section 120 (the blur amount detecting section 1210 and the blur correcting section 1220) reads out the above-described program, and performs blur correction processing of cutting out an image with a size corresponding to the blur amount detected in the first frame from each frame in the first frame section where a blur amount equal to and larger than the first threshold TH1 and smaller than the second threshold TH2 is detected and the second frame sections preceding and subsequent thereto, and adjusting the position and size of the cut-out image in line with other frames.

Thus, a moving-image capturing program can be provided that continuous moving images can be viewed without an abrupt change in the magnification ratio of the images cut out for correction even when a large "blur" is present in the captured moving images.

While the present invention has been described with reference to the preferred embodiments, it is intended that the invention be not limited by any of the details of the description therein but includes all the embodiments which fall within the scope of the appended claims.

What is claimed is:

1. An image processing device comprising:
an acquiring section which acquires a blur at imaging in a captured moving image;
a first setting section which sets, for a first moving image in a first predetermined period in which a blur is acquired by the acquiring section among captured moving images, a first correction range based on the blur of the first moving image;
a second setting section which sets, for a second moving image in a second predetermined period preceding the first predetermined period in which the blur is acquired by the acquiring section among the captured moving images, a second correction range based on the blur of the first moving image in the first predetermined period in which the blur is acquired by the acquiring section; and
a processing unit which performs predetermined processing on the first moving image and the second moving image using the first correction range and the second correction range, respectively.

2. The image processing device according to claim 1, wherein the second correction range is smaller than the first correction range.

3. The image processing device according to claim 1, wherein a change of a correction margin of an effective imaging range is included in settings of the first correction range and the second correction range.

4. The image processing device according to claim 1, wherein the second setting section sets the second correction range when the first correction range set by the first setting section is larger than a predetermined range.

5. The image processing device according to claim 4, wherein the first correction range includes an effective imaging range.

6. The image processing device according to claim 1, wherein the first correction range and the second correction range include a condition in which a resolution of the moving images is decreased in a stepwise manner.

7. The image processing device according to claim 1, further comprising:
an imaging section; and
an imaging control section which controls the imaging section such that the imaging section images at predetermined time intervals,
wherein the acquiring section detects and acquires a blur at imaging by the imaging control section.

8. The image processing device according claim 1, further comprising a correcting section which corrects the blur of the first and second moving images in the first and second predetermined periods according to the first correction range and the second correction range.

9. The image processing device according to claim 1, further comprising:
a blur amount acquiring section which acquires a blur amount of the blur acquired by the acquiring section,
wherein the first setting section sets, when the blur amount acquired by the blur amount acquiring section is equal to or larger than a first threshold set in advance, the first correction range based on the blur amount for the first moving image in the first predetermined period in which the blur is acquired by the acquiring section among the captured moving images, and
wherein the second setting section sets the second correction range, based on the blur amount acquired by the blur amount acquiring section, for the second moving image in the second predetermined period preceding the first predetermined period in which the blur is acquired by the acquiring section.

10. The image processing device according to claim 9, further comprising a third setting section which sets a third correction range determined in advance for a moving image in a predetermined period in which the blur is acquired by the acquiring section and in which the blur amount is smaller than the first threshold.

11. The image processing device according to claim 9, further comprising a generating section which generates a moving image corresponding to the first moving image in the first predetermined period in which the blur is acquired by the acquiring section among the captured moving images, by discarding a moving image in a predetermined period in which the blur amount acquired by the blur amount acquiring section is equal to or larger than a second threshold which is larger than the first threshold, and interpolating, for the discarded moving image, each frame in a moving image in at least one of predetermined periods preceding and subsequent to the predetermined period in which the moving image is discarded.

12. The image processing device according to claim 9, further comprising a changing section which changes, according to the blur amount acquired by the blur amount acquiring section, a length of one of the predetermined periods preceding and subsequent to the first predetermined period in which the blur is acquired by the acquiring section.

13. The image processing device according to claim 1, wherein the second setting section sets the second correction range for moving images in the second predetermined period preceding the first predetermined period in which the blur is acquired by the acquiring section such that the second correction range gradually increases as the moving images become closer to the first predetermined period in which the blur is acquired by the acquiring section and gradually decreases as the moving images become farther away from the first predetermined period in which the blur is acquired by the acquiring section.

14. The image processing device according to claim 1, further comprising a storage section which stores a plurality of moving images captured at predetermined intervals,
wherein the first setting section sets, for the first moving image in the first predetermined period in which the blur is acquired by the acquiring section among the plurality of moving images stored in the storage section, the first correction range based on the blur of the moving image.

15. The image processing device according to claim 1, further comprising a storage section which stores a plurality of moving images captured at predetermined intervals,
wherein the second setting section sets, for the second moving image in the second predetermined period preceding the first predetermined period in which the blur is acquired by the acquiring section among the plurality of moving images stored in the storage section, the second correction range based on the blur of the first moving image in the first predetermined period in which the blur is acquired by the acquiring section.

16. The image processing device according to claim 1, further comprising a storage section which stores a plurality of moving images captured at predetermined intervals,
wherein the first setting section and the second setting section perform setting for a moving image to be corrected when all data of the plurality of moving images is replayed.

17. The image processing device according to claim 16, further comprising a temporary storage section which temporarily stores the plurality of moving images captured at the predetermined intervals,
wherein the first setting section and the second setting section perform setting for the moving image to be corrected, which is stored in the temporary storage section, when all the data of the plurality of moving images is stored in the storage section.

18. An image processing device comprising:
a storage section which stores a plurality of continuous images continuously captured at predetermined intervals as one set;
an acquiring section which acquires a blur at continuous capturing;
a first setting section which sets, for a first set of continuous images in a first continuous capturing period in which a blur is acquired by the acquiring section among sets of the continuous images stored in the storage section, a first correction range based on the blur of the first set of continuous images;
a second setting section which sets, for a second set of continuous images in a second period preceding the first continuous capturing period in which the blur is acquired by the acquiring section among the sets of the continuous images stored by the storage section, a second correction range based on the blur of the first set of continuous images in the first continuous capturing period in which the blur is acquired by the acquiring section; and
a processing unit which performs predetermined processing on the first set of continuous images and the second set of continuous images using the first correction range and the second correction range, respectively.

19. An image processing method comprising:
acquiring a blur at imaging of a captured moving image;
setting, for a first moving image in a first predetermined period in which the blur is acquired in the acquiring among captured moving images, a first correction range based on the blur of the first moving image;
setting, for a second moving image in a second predetermined period preceding the first predetermined period in which the blur is acquired in the acquiring among the captured moving images, a second correction range based on the blur of the first moving image in the first predetermined period in which the blur is acquired in the acquiring step; and
performing predetermined processing on the first moving image and the second moving image using the first correction range and the second correction range, respectively.

20. An image processing method comprising:
acquiring a blur at continuous capturing;
setting, for a first set of continuous images in a first continuous capturing period in which a blur is acquired in the acquiring among sets of continuous images stored in a storage section in which a plurality of continuous images continuously captured at predetermined intervals are stored as one set, a first correction range based on the blur of the first set of continuous images;
setting, for a second set of continuous images in a second period preceding the first continuous capturing period in which the blur is acquired in the acquiring among the sets of the continuous images, a second correction range based on the blur of the first set of continuous images in the first continuous capturing period in which the blur is acquired in the acquiring step; and
performing predetermined processing on the first set of continuous images and the second set of continuous images using the first correction range and the second correction range, respectively.

21. A non-transitory computer-readable storage medium having stored thereon a program that is executable by a computer included in an image processing device, the program being executable by the computer to perform functions comprising:
acquisition processing for acquiring a blur at imaging of a captured moving image;
first setting processing for setting, for a first moving image in a first predetermined period in which the blur is acquired by the acquisition processing among the captured moving images, a first correction range based on the blur of the first moving image;
second setting processing for setting, for a second moving image in a second predetermined period preceding the first predetermined period in which the blur is acquired in the acquisition processing among the captured moving images, a second correction range based on the blur of the first moving image in the first predetermined period in which the blur is acquired by the acquisition processing; and
performing predetermined processing on the first moving image and the second moving image using the first correction range and the second correction range, respectively.

22. A non-transitory computer-readable storage medium having stored thereon a program that is executable by a computer included in an image processing device, the program being executable by the computer to perform functions comprising:
acquisition processing for acquiring a blur at continuous capturing;
first setting processing for setting, for a first set of continuous images in a first continuous capturing period in which a blur is acquired by the acquisition processing among sets of the continuous images stored in a storage section in which a plurality of continuous images continuously captured at predetermined intervals are stored as one set, a first correction range based on the blur of the first set of continuous images;

second setting processing for setting, for a second set of continuous images in a second period preceding the first continuous capturing period in which the blur is acquired by the acquiring processing among the sets of the continuous images stored by the storage processing, a second correction range based on the blur of the first set of continuous images in the first continuous capturing period in which the blur is acquired by the acquiring processing; and performing predetermined processing on the first set of continuous images and the second set of continuous images using the first correction range and the second correction range, respectively.

23. The image processing device according to claim 1, wherein the first moving image is captured after the second moving image in time series, and the second predetermined period precedes the first predetermined period with respect to time.

* * * * *

UNITED STATES PATENT AND TRADEMARK OFFICE
CERTIFICATE OF CORRECTION

PATENT NO. : 9,628,712 B2  
APPLICATION NO. : 14/222515  
DATED : April 18, 2017  
INVENTOR(S) : Ken Fujita et al.

Page 1 of 1

It is certified that error appears in the above-identified patent and that said Letters Patent is hereby corrected as shown below:

In the Claims

Column 20, Line 9, after "according" insert --to--.

Signed and Sealed this
Fourth Day of July, 2017

Joseph Matal
*Performing the Functions and Duties of the*
*Under Secretary of Commerce for Intellectual Property and*
*Director of the United States Patent and Trademark Office*